US008743405B2

(12) United States Patent
Oishi

(10) Patent No.: US 8,743,405 B2
(45) Date of Patent: Jun. 3, 2014

(54) PRINT RELAY DEVICE, PRINT SYSTEM, PRINT RELAY DEVICE CONTROL METHOD, AND STORAGE MEDIUM

(71) Applicant: Canon Kabushiki Kaisha, Tokyo (JP)

(72) Inventor: Tetsu Oishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 54 days.

(21) Appl. No.: 13/671,827

(22) Filed: Nov. 8, 2012

(65) Prior Publication Data

US 2013/0163038 A1 Jun. 27, 2013

(30) Foreign Application Priority Data

Dec. 21, 2011 (JP) ................. 2011-279541

(51) Int. Cl.
G06F 3/12 (2006.01)
G06K 15/00 (2006.01)

(52) U.S. Cl.
USPC .......... 358/1.15; 358/1.1; 358/1.16; 358/1.13

(58) Field of Classification Search
None
See application file for complete search history.

(56) References Cited

U.S. PATENT DOCUMENTS

| 7,978,360 B2 | 7/2011 | Tamai et al. | |
| 2011/0216354 A1* | 9/2011 | Naito | 358/1.15 |
| 2012/0050794 A1* | 3/2012 | Ikeda | 358/1.15 |
| 2013/0027740 A1* | 1/2013 | Sachithanathan et al. | 358/1.15 |

FOREIGN PATENT DOCUMENTS

JP 2003-196054 A 7/2003

* cited by examiner

Primary Examiner — Thomas Lett
(74) Attorney, Agent, or Firm — Carter, DeLuca, Farrell & Schmidt LLP

(57) ABSTRACT

A print relay device acquires printer information which is registered in a print service server and is linked to a user. In order to cause an image forming device to receive a print job from the print service device via the print relay device, the print relay device specifies printer information that is not registered in the print relay device from among the acquired printer information, and additionally registers the specified printer information in the printer information which is registered in the print service server and is linked to the user.

10 Claims, 18 Drawing Sheets

| ServiceName |
|---|
| Print Service A |
| Print Service B |

FIG. 8B

| 1301 | 1302 | 1303 | 1304 | 1305 | 1306 | 1307 |
|---|---|---|---|---|---|---|
| Virtual Printer ID | Service Name | Real Printer ID | Printer Kind | Service Printer ID | Name | Capabilities |
| VPBCH-8EA1CB19-5D9E | Print Service A | RP-E2B53416-B536 | AAA | SP-5D15DEAF-BE3C | Printer 1 | PC 1 |
| VPBCH-94E1E881-BEFA | Print Service A | RP-E5BF5531-CAF9 | AAB | SP-2336ACD3-4D27 | Printer 2 | PC 2 |
| VPBCH-D24B4912-2866 | Print Service A | RP-677F2761-B68D | AAC | SP-1AE5A901-3D8C | Printer 3 | PC 3 |
| VPBCH-40BDE35B-A6D4 | Print Service A | RP-2080F643-FB08 | AAD | SP-F5C17CC0-1877 | Printer 4 | PC 4 |
| VPBCH-A4DB3F7A-0123 | Print Service A | RP-DE0E88F6-6115 | AAE | SP-4120C0A0-99A3 | Printer 5 | PC 5 |

FIG. 8B1

| 1301 | 1302 | 1303 | 1304 | 1305 | 1306 | 1307 |
|---|---|---|---|---|---|---|
| Virtual Printer ID | Service Name | Real Printer ID | Printer Kind | Service Printer ID | Name | Capabilities |
| VPBCH-2531CB19-5D9E | Print Service A | RP-CDB5DC16-6536 | AAA | SP-3KM15KEG-892E | Printer C | PC 1 ~803 |
| VPBCH-9889E881-BEFA | Print Service A | RP-3IOK5431-C839 | AAB | SP-II3KI93KEE-343D | Printer D | PC 2 ~804 |
| VPBCH-8EA1CB19-5D9E | Print Service A | RP-E2B53416-B536 | AAA | SP-5D15DEAF-BE3C | Printer 1 | PC 1 |
| VPBCH-94E1E881-BEFA | Print Service A | RP-E5BF5531-CAF9 | AAB | SP-2336ACD3-4D27 | Printer 2 | PC 2 |
| VPBCH-D24B4912-2866 | Print Service A | RP-677F2761-B68D | AAC | SP-1AE5A901-3D8C | Printer 3 | PC 3 |
| VPBCH-40BDE35B-A6D4 | Print Service A | RP-2080F643-FB08 | AAD | SP-F5C17CC0-1877 | Printer 4 | PC 4 |
| VPBCH-A4DB3F7A-0123 | Print Service A | RP-DE0E88F6-6115 | AAE | SP-4120C0A0-99A3 | Printer 5 | PC 5 |

FIG. 8C

| 1401 | 1402 | 1403 | 1404 | 1405 | 1406 |
|---|---|---|---|---|---|
| Service Printer ID | Name | Capabilities | Virtual Printer ID | User Name | Password |
| SP-5D15DEAF-BE3C | Printer 1 | PC 1 | VPBCH-8EA1CB19-5D9E | User A | Use A |
| SP-2336ACD3-4D27 | Printer 2 | PC 2 | VPBCH-94E1E881-BEFA | User A | User A |
| SP-1AE5A901-3D8C | Printer 3 | PC 3 | VPBCH-D24B4912-2866 | User A | User A |
| SP-F5C17CC0-1877 | Printer 4 | PC 4 | VPBCH-40BDE35B-A6D4 | User A | User A |
| SP-4120C0A0-99A3 | Printer 5 | PC 5 | VPBCH-A4DB3F7A-0123 | User A | User A |

FIG. 9C1

| 1401 | 1402 | 1403 | 1404 | 1405 | 1406 | |
|---|---|---|---|---|---|---|
| Service Printer ID | Name | Capabilities | Virtual Printer ID | User Name | Password | |
| SP-3KM15KEG-892E | Printer C | PC C | Printer C's MAC Adress | User A | User A | ~801 |
| SP-II3KI93KEE-343D | Printer D | PC D | Printer D's PD's MAC Adress | User A | User A | ~802 |
| SP-5D15DEAF-BE3C | Printer 1 | PC 1 | VPBCH-8EA1CB19-5D9E | User A | User A | |
| SP-2336ACD3-4D27 | Printer 2 | PC 2 | VPBCH-94E1E881-BEFA | User A | User A | |
| SP-1AE5A901-3D8C | Printer 3 | PC 3 | VPBCH-D24B4912-2866 | User A | User A | |
| SP-F5C17CC0-1877 | Printer 4 | PC 4 | VPBCH-40BDE35B-A6D4 | User A | User A | |
| SP-4120C0A0-99A3 | Printer 5 | PC 5 | VPBCH-A4DB3F7A-0123 | User A | User A | |

FIG. 9C2

| 1401 | 1402 | 1403 | 1404 | 1405 | 1406 | |
|---|---|---|---|---|---|---|
| Service Printer ID | Name | Capabilities | Virtual Printer ID | User Name | Password | |
| SP-3KM15KEG-892E | Printer C | PC C | VPBCH-2531CB19-5D9E | User A | User A | ~805 |
| SP-II3KI93KEE-343D | Printer D | PC D | VPBCH-9889E881-BEFA | User A | User A | ~806 |
| SP-3KM15KEG-892E | Printer C | PC C | Printer C's MAC Adress | User A | User A | ~807 |
| SP-II3KI93KEE-343D | Printer D | PC D | Printer D's PD's MAC Adress | User A | User A | ~808 |
| SP-5D15DEAF-BE3C | Printer 1 | PC 1 | VPBCH-8EA1CB19-5D9E | User A | User A | |
| SP-2336ACD3-4D27 | Printer 2 | PC 2 | VPBCH-94E1E881-BEFA | User A | User A | |
| SP-1AE5A901-3D8C | Printer 3 | PC 3 | VPBCH-D24B4912-2866 | User A | User A | |
| SP-F5C17CC0-1877 | Printer 4 | PC 4 | VPBCH-40BDE35B-A6D4 | User A | User A | |
| SP-4120C0A0-99A3 | Printer 5 | PC 5 | VPBCH-A4DB3F7A-0123 | User A | User A | |

FIG. 9C3

| 1401 | 1402 | 1403 | 1404 | 1405 | 1406 |
|---|---|---|---|---|---|
| Service Printer ID | Name | Capabilities | Virtual Printer ID | User Name | Password |
| SP-3KM15KEG-892E | Printer C | PC C | VPBCH-2531CB19-5D9E | User A | User A |
| SP-II3KI93KEE-343D | Printer D | PC D | VPBCH-9889E881-BEFA | User A | User A |
| SP-5D15DEAF-BE3C | Printer 1 | PC 1 | VPBCH-8EA1CB19-5D9E | User A | User A |
| SP-2336ACD3-4D27 | Printer 2 | PC 2 | VPBCH-94E1E881-BEFA | User A | User A |
| SP-1AE5A901-3D8C | Printer 3 | PC 3 | VPBCH-D24B4912-2866 | User A | User A |
| SP-F5C17CC0-1877 | Printer 4 | PC 4 | VPBCH-40BDE35B-A6D4 | User A | User A |
| SP-4120C0A0-99A3 | Printer 5 | PC 5 | VPBCH-A4DB3F7A-0123 | User A | User A |

FIG. 10A
Registration in print service

Print service: ▷ 901
Print Service A
Print Service B

User ID: ▭ 902
Password: ▭ 903

[Register] 904

FIG. 10B
Print settings

Duplex setting: ▷ 910
1-Side Printing
2-Side Printing

Color setting: ▷ 911
Color
Mono

Page size: ▷ 912
B5
A4
A3

[Execute print] 913

FIG. 10C
Print dialogue

▷ 914
Printer 4
Printer 2
Printer 1
Printer 5
Printer 3

[Set] 915

FIG. 11A
```
<Capabilities>
    <Duplex>
        <Item>1-Side</Item>
        <Item>2-Side</Item>
    </Duplex>
    <Color>
        <Item>mono</Item>
        <Item>color</Item>
    </Color>
    <PaperSize>
        <Item>B5</Item>
        <Item>A4</Item>
        <Item>A3</Item>
    </PaperSize>
</Capabilities>
```

FIG. 11B
```
<PrintSettings>
    <Duplex>
        <Item>2-Side</Item>
    </Duplex>
    <Color>
        <Item>mono</Item>
    </Color>
    <PaperSize>
        <Item>A4</Item>
    </PaperSize>
</PrintSettings>
```

FIG. 11C
```
<PrintJob>
    <id>
        <Item>5846759561318635695</Item>
    </id>
    <title>
        <Item>Doc1</Item>
    </title>
    <status>
        <Item>QUEUED</Item>
    </status>
    <dataUrl>
        <Item>http://prt.srv.com/data/5846759561318635695</Item>     —1001
    </dataUrl>
    <settingUrl>
        <Item>http://prt.srv.com/setting/5846759561318635695</Item>  —1002
    </settingUrl>
</PrintJob>
```

FIG. 11D
```
<PrintJob>
    <id>
        <Item>5846759561318635695</Item>
    </id>
    <title>
        <Item>Doc1</Item>
    </title>
    <status>
        <Item>QUEUED</Item>
    </status>
    <dataUrl>
        <Item>http://vprinter.com/VP8CH67YXF42BBF2TQ449H8XA          —1003
            /data/5846759561318635695</Item>
    </dataUrl>
    <settingUrl>
        <Item>http://vprinter.com/VP8CH67YXF42BBF2TQ449H8XA          —1004
            /setting/5846759561318635695</Item>
    </settingUrl>
</PrintJob>
```

PRINT RELAY DEVICE, PRINT SYSTEM, PRINT RELAY DEVICE CONTROL METHOD, AND STORAGE MEDIUM

BACKGROUND OF THE INVENTION

1. Field of the Invention

The present invention relates to a print relay device, a print system, a print relay device control method, and a storage medium.

2. Description of the Related Art

A content print system in which a print instruction is transmitted from a client to a server and the server that has received the print instruction converts the content to be printed into print data has been proposed. The cloud computing that has been attracting attention is also one of system architectures for providing a service from a server to a client.

As described above, there has conventionally been known the presence of a form in which a Web server provides a service to a client. A cloud computing that has recently been attracting attention is also a form in which a Web server provides a service to a client. A main feature of the cloud computing is that data conversion and data processing are executed in a distributed manner using many computing resources so as to process requests from many clients in a simultaneous manner. At present, too many vendors provide various types of services by implementing Web services on a cloud computing environment for realizing the cloud computing in a disorderly way.

Among vendors who provide services on a cloud computing environment, Google (registered trademark) is a notable vendor. Google (registered trademark) not only establishes many large-scale data centers but also develops a data communication structure between devices and services so as to provide services in cooperation with devices. For example, Google (registered trademark) has developed a data communication structure for providing services in cooperation with image forming devices and has disclosed an interface for providing data communication between the cloud computing environment prepared by Google (registered trademark) and image forming devices. In this system, the image forming device receives a print request from a service and executes printing.

Japanese Patent Laid-Open No. 2003-196054 discloses a system in which a client that has received a print request transmits client information and a print data generation request to a server and the server acquires print control information corresponding to client information to thereby generate print data.

There might be a case where a print relay device is provided that provides a print relay service between an image print device such as a printer and a print service device that provides a print service on a cloud computing environment. By providing a print relay device serving as a relay server, a vendor device that provides a print service can readily register/manage a printer and provide value-added services such as aggregation.

However, in the Google's (registered trademark) cloud environment, conventional printers, "printers having a dedicated interface implemented", and "printers connected to a proxy PC having a dedicated interface implemented" need to be managed in a different way. The "printers having a dedicated interface implemented" and the "printers connected to a proxy PC having a dedicated interface implemented" can be connected to a print service device without passing through a print relay device. Hence, the print relay device has no means for knowing printer information about the "printers having a dedicated interface implemented" and the "printers connected to a proxy PC having a dedicated interface implemented". When a different print procedure is employed, the print relay device may not be able to gather printer information, the print relay device cannot integrally manage printers based on experience values such as information collection, print suppression, or the like. In other words, all the printers cannot be managed or services cannot be provided to all the printers by simply providing a relay server.

SUMMARY OF THE INVENTION

The present invention provides a print relay device that acquires printer information from a print service device and integrally manages printers not managed by the print relay device for providing a print relay service.

According to an aspect of the present invention, a print relay device is provided that communicates with a print service device, which registers printer information including printer capabilities upon registration of an image forming device, receives print settings set by a user via a print setting screen displayed on a user device, and transmits a print job corresponding to the print settings to the image forming device, via a network. The print relay device includes an acquisition unit configured to acquire printer information which is registered in the print service server and is linked to the user; a specification unit configured to specify printer information that is not registered in the print relay device among the acquired printer information; and a registration unit configured to additionally register printer information, in which information relating to the transmission destination in the printer information specified by the specification unit has been replaced with information indicating the transmission destination is the print relay device, in the print service server in order to receive the print job from the print service server to the image forming device via the print relay device.

Further features of the present invention will become apparent from the following description of exemplary embodiments with reference to the attached drawings.

BRIEF DESCRIPTION OF THE DRAWINGS

FIGS. 8A to 8C are tables illustrating information to be stored in devices constituting a print system.

FIGS. 9C1 to 9C3 are tables illustrating information to be stored in a print service.

FIGS. 10A to 10C are diagrams illustrating an exemplary display screen to be displayed by a Web browser.

FIGS. 11A to 11D are tables illustrating the respective information represented by XML format.

DESCRIPTION OF THE EMBODIMENTS

First Embodiment

Figure 1:
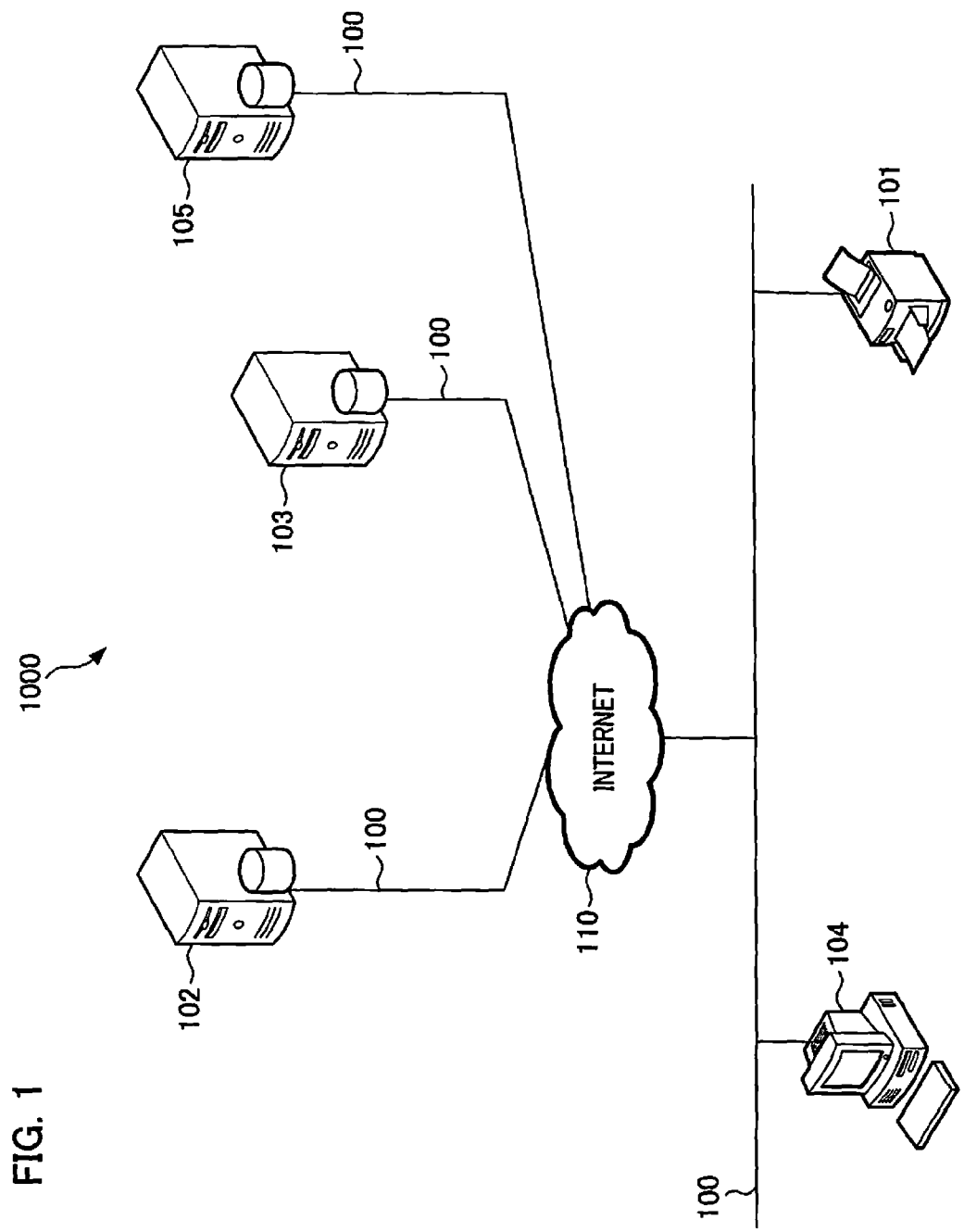
FIG. 1 is a diagram illustrating an example of the configuration of a print system according to a first embodiment.

FIG. 1 is a diagram illustrating the configuration of a print system 1000. The print system 1000 includes a client computer 104 and an image forming device 101. The client computer 104 and the image forming device 101 are devices that are arranged in a user environment and is communicably connected to each other via a network 100. The network 100 is connected to Internet 110.

Also, the print system 1000 includes a Web application server group 105 and a print server group 103. Both server groups may also be server groups provided by the same vendor. In this case, both server groups may also be connected to each other via the network 100. The print system 1000 also includes a print relay server 102. The print relay server 102 is connected to the network 100 and the network 100 is connected to the Internet 110. In the present embodiment, devices and server groups constituting the print system 1000 are connectable to each other via the Internet 101 and can perform data communication with each other. The number of devices is only one shown in FIG. 1, but may be in plural. The number of server groups is in plural, but may be one.

Figure 2:
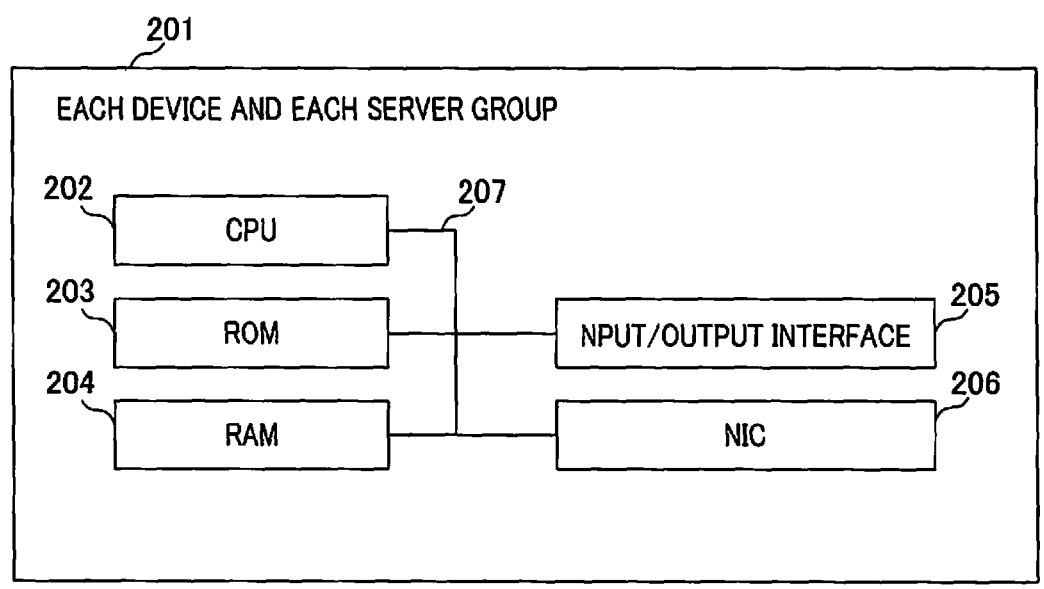
FIG. 2 is a diagram illustrating the hardware configuration of each device and each server group constituting a print system.

FIG. 2 is a diagram illustrating an example of the hardware configuration of each device and each server group constituting the print system 1000. Reference numeral 201 denotes each device and each server group constituting the print system 1000. A CPU (Central Processing Unit) 202 is a unit that executes various programs and realizes various functions. A ROM (Read Only Memory) 203 is a unit that stores various programs. A RAM (Random Access Memory) 204 is a storage unit that functions as a temporal working storage region for the CPU 202. The CPU 202 loads a program stored in the ROM 203 into the RAM 204 to thereby execute the program. An Input/Output interface 205 transmits data to a display (not shown) connected to each device and each server group.

Also, the Input/Output interface 205 is an interface unit that receives data from a pointing device (not shown). An NIC (Network Interface Card) 206 is a unit that connects the devices and server groups constituting the print system 1000 to the network 100. The aforementioned units can perform reception/transmission of data via a bus 207. Also, the image forming device 102 includes a print unit (not shown). The print unit can receive/transmit data from/to the units via the bus 207. The print unit is a unit that can print a raster image on a recording medium.

Figure 3:
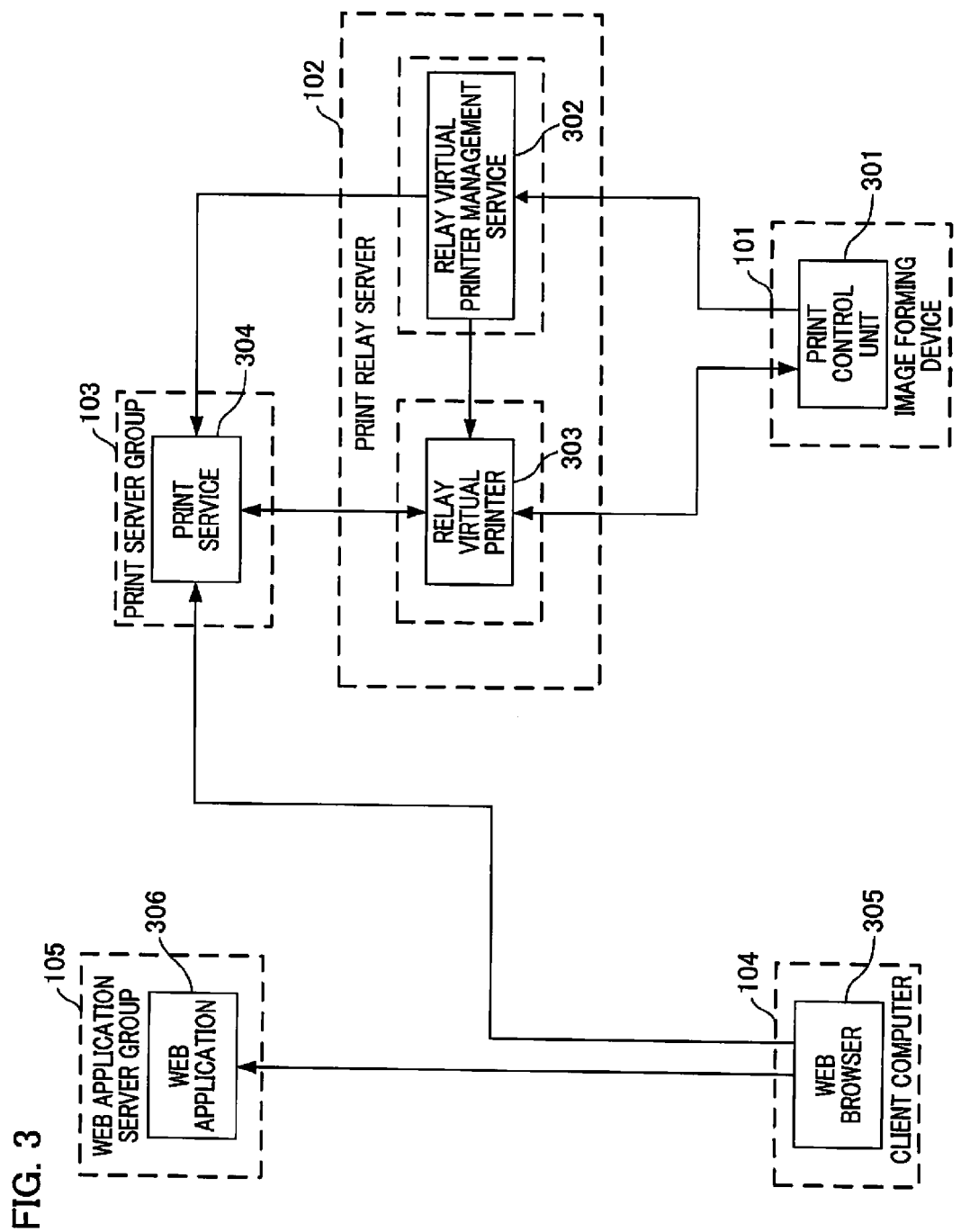
FIG. 3 is a diagram illustrating the software configuration of each device and each server group constituting a print system.

FIG. 3 is an exemplary functional block diagram illustrating devices and server groups constituting the print system 1000. Programs for realizing the functions of software shown in FIG. 3 are stored in the ROMs 203 of the devices and server groups. The functions are realized by the fact that the CPU 202 loads programs into the RAM 204 and executes the programs.

A description of functions will be generally given by separating in a first half and a second half. A description of basic function consisting of two groups will be given in the first half. Next, in the second half, a description will be given of the development function by developing the basic function consisting of two groups described in the first half to thereby integrally manage a conventional printer, a "printer having a dedicated interface implemented" or a "printer connected to a proxy PC having a dedicated interface implemented".

Here, the conventional printer is a native printer not implemented an interface for performing data communication with the cloud computing environment prepared by Google (registered trademark) in a case of Google (registered trademark). The "printer having a dedicated interface implemented" is a native printer implemented an interface for performing data communication with the cloud computing environment prepared by Google (registered trademark) in a case of Google (registered trademark). The "printer connected to a proxy PC having a dedicated interface implemented" is a conventional printer installed in "a proxy PC having a dedicated interface implemented", that is, "PC in which GoogleChrome runs".

A feature of the basic function described in the first half is that a print job in the following three print function is distributed to the printer via the service printer and the relay virtual printer. A feature of the development function described in the second half is that the "printer having a dedicated interface implemented" and the "printer connected to a proxy PC having a dedicated interface implemented" that has been already registered in the print system is re-registered in the relay virtual printer.

Hereinafter, a description will be given of basic functions of two groups as first half. The function classified as a first group is a function classified as a registration that registers the image forming device 102 in the print relay server 103 and realizes a relay virtual printer 303 within the print relay server 103 to thereby register the relay virtual printer 303 in a print service 304.

The function classified as a second group is a function classified as a print that firstly transmits the content data generated by the Web application server group 105 to the print server group 103 and then causes an image forming device to print out print data based on a print notification transmitted from the print server group 103. When the print system causes the image forming device 101 to print out print data based on the print notification information transmitted from the print server group 103, the print server group 103 transmits a print notification to the image forming device 101 via the print relay server 102 serving as an intermediary and causes the image forming device 101 to print out print data.

Firstly, a description will be given of the function classified as the registration that is the first group. A description will be given of the function classified as the registration provided in the image forming device 101. The image forming device 101 has print control unit 301. The print control unit 301 realizes the functions shown in FIG. 4. More specifically, the print control unit 301 includes a display unit 401, a print service information holding unit 402, and a registration unit 403. The display unit 401 displays various screens. The print service information holding unit 402 has information about the print service 304. FIG. 8A shows information about a print service. Although information about a plurality of print services is shown in FIG. 8A, the print service 304 according to the first embodiment corresponds to a Print Service A. When the processing for registering the image forming device 101 in the print service 304 is instructed from a user, the display unit 401 generates and displays the UI for registration in a print service as shown in FIG. 10A based on information shown in FIG. 8A. On the screen shown in FIG. 10A, a user selects a print service in which the image forming device 101 is desired to be registered from a button 901.

In the case of the first embodiment, there is only one print service, i.e., the print service 304, a user has no choice but to select the Print Service A. The user inputs a user ID 902 and a password 903 to the selected print service 304.

Next, the user pushes a registration button 904. The registration unit 403 issues registration information in response to the pressing of the registration button 1004 by the user. In the first embodiment, there is only one print service, i.e., the print service 304. When a plurality of print services is selectable, a user ID and a password can be separately set to each print service. Also, the registration unit 403 transmits the issued registration information to a request reception unit 501 provided in a relay virtual printer management service 302 to be described below. The other functions which have not previously been described will be described below.

Here, a description will be given of registration information. Registration information includes a print service name. The print service name is information for specifying a print service selected by a user. In other words, the print service name is information for specifying the print service 304 provided in the print server group 103. Also, registration information includes a user ID and a password. The user ID and the password are information required for utilizing the print service 304 and the Web application server group 105. The user ID and the password are referred to as "user information". In the present embodiment, it is assumed that the Web application server group 105 and the print server group 103 are provided by the same vendor. Thus, when a user uses services provided by both server groups, the user can use both services using the same user information. In the first embodiment, it is assumed that a user has already registered user information in the Web application server group 105 in advance.

Also, registration information includes an RPID (Real Printer ID) that is unique identification information assigned to the image forming device 101. Unique identification information is assigned to each image forming device (not shown) including the image forming device 101, and thus, each image forming device is specified by unique identification information. A MAC address that is a unique number of the communication device is applied as the RPID. In the first embodiment, the location for placement of each image forming device can be specified by specifying the RPID. Also, registration information includes Printer Kind that is device model information about the image forming device 101. The identical device model information is assigned to the devices of the same kind. When two image forming devices are the devices of the same kind, it refers to the fact that two image forming devices incorporate the same the communication module B'. A detailed separate description will be given below of the communication module B', a communication module A, a communication module A', and a communication module B.

Also, registration information includes the printer name of the image forming device 101. The printer name is a name that is assigned to the image forming device 101 and is used for designating the image forming device 101. Unlike identification information, the image forming devices may have the same printer name.

Also, registration information includes capabilities. Capabilities are information indicating the capability of the image forming device 101. Capabilities include, for example, information indicating whether or not the image forming device 101 can perform duplex printing, information indicating whether or not the image forming device 101 can perform color printing, and information about the size of a paper sheet which can be output. Capabilities are the print function of the image forming device 101. Also, capabilities are transmitted to the request reception unit 501 in XML format as shown in FIG. 11A. Each parenthesis <Item> shown in FIG. 11A indicates the print capability of the image forming device 101. In this example, it is indicated that the image forming device 101 can perform imposition printing, color printing, and can output sheets of paper with the size of B5, A4, and A3.

Figure 5:
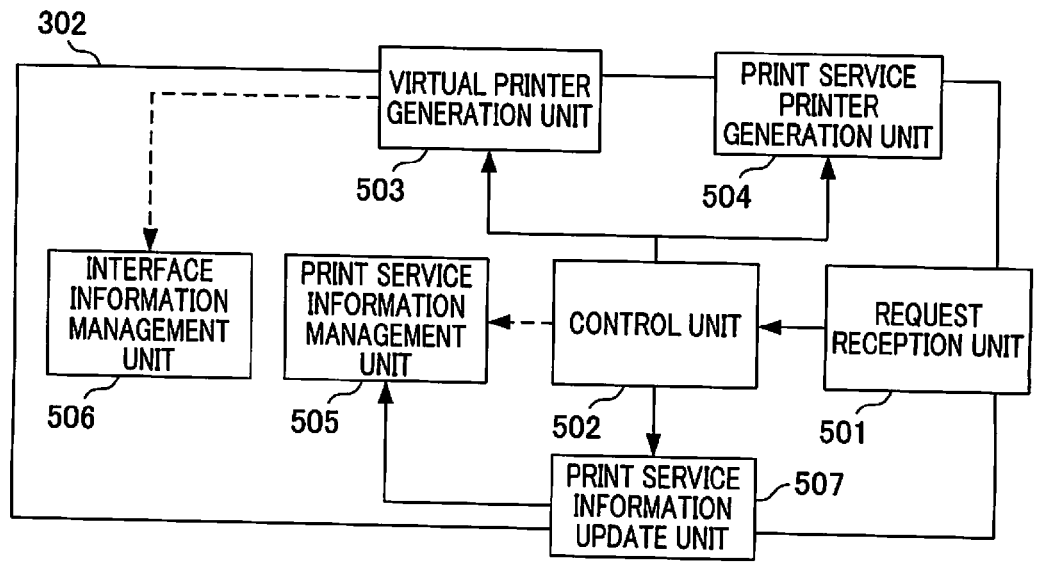
FIG. 5 is an exemplary functional block diagram illustrating a relay virtual printer management service.

Next, a description will be given of the function classified as the registration provided by the print relay server 102. The print relay server 102 has the relay virtual printer management service 302. FIG. 5 is a functional block diagram illustrating the relay virtual printer management service 302. The relay virtual printer management service 302 includes a request reception unit 501, a control unit 502, a virtual printer generation unit 503, a print service printer generation unit 504, a print service information management unit 505, and an interface information management unit 506. The request reception unit 501 receives registration information. The control unit 502 can acquire registration information received by the request reception unit 501 and interpret the registration information. Then, the control unit 502 provides instructions to the virtual printer generation unit 503 and the print service printer generation unit 504 to perform the following two processes. The first process is a process for realizing the function of the relay virtual printer 303 by the virtual printer generation unit 503. The second process is a process for registering information about the relay virtual printer 303 in the print service 304 by the print service printer generation unit 504. Note that a solid arrow means execution/writing processing and a dashed arrow means reading processing throughout the drawings.

A description will be given of the first process, that is, the process for realizing the function of the relay virtual printer 303 by the virtual printer generation unit 503. The relay virtual printer 303 realizes the functions shown in FIG. 6, and the details of which will be described below. The virtual printer generation unit 503 specifies and acquires a communication module B 602 stored in the interface information management unit 506 based on Printer Kind transmitted from the control unit 502. Also, the virtual printer generation unit 503 specifies and acquires a communication module A' 601 stored in the interface information management unit 506 based on the print service name. The communication module B is a module that performs communication with the image forming device 101. Since the devices of the same model have the same communication module B as described above, the devices of the same model can specify the communication module B from Printer Kind. The communication module B communicates with a communication module B' 410 provided in the print control unit 301. The communication module A' 601 is a module that performs communication with the print server group 103, and is a module that can communicate with a communication module A 707 provided in the print service 304. The virtual printer generation unit 503 that has acquired two or more communication modules realizes a process (thread) into which two or more communication modules have been loaded. The process corresponds to the relay virtual printer 303.

The virtual printer generation unit 503 realizes the relay virtual printer 303, and then issues a VPID (Virtual Printer ID) that is identification information for identifying the realized relay virtual printer 303. The RPID described above may be employed as the VPID or the virtual printer generation unit 503 may uniquely generate VPID. Alternatively, the MAC address of the print relay server 102 may be employed as the VPID. The virtual printer generation unit 503 transmits the issued VPID to the control unit 502. The relay virtual printer 303 is realized each time the registration information is transmitted from the image forming device 101. The VPID, i.e., a unique identifier, is assigned to each of the realized relay virtual printers 303. In the first embodiment, the location for placement of the relay virtual printer 303 can be specified by specifying VPID.

Next, a description will be given of the second process, that is, the process for registering information about the relay virtual printer 303 in the print service 304 by the print service printer generation unit 504. The control unit 502 transmits user information to the print service printer generation unit 504. The print service printer generation unit 504 authenticates the print server group 103 based on the received user information. When the authentication is successful, the print service printer generation unit 504 transmits a printer name, capabilities, and a VPID to the print service 304.

The print service printer generation unit 504 receives a SPID (Service Printer ID) as a response from the print service 304. The SPID is identification information issued for the purpose of identifying the print of which the print service 304 has received the print registration request. The control unit 502 acquires VPIDs and SPIDs from the virtual printer generation unit 503 and the print service printer generation unit 504, respectively. The control unit 502 that has acquired the VPIDs and SPIDs instructs the print service information management unit 505 to store the information. The print service information management unit 505 stores VPIDs, SPIDs, and registration information by associating them with each other as shown in FIG. 8B. Reference numerals 1301, 1302, 1303, and 1304 correspond to VPID, print service name, RPID, and Printer Kind, respectively. Also, reference numerals 1305, 1306, and 1307 correspond to SPID, printer name, and capabilities, respectively.

Next, a description will be given of the function classified as the registration provided by the print server group 103. The print server group 103 has the print service 304. The print server group 103 virtualizes a plurality of servers as a single server, and realizes the function of the print service 304 by means of the single server. The print server group 103 activates a plurality of virtual machines in the single server, and causes each virtual machine to realize the function of the print service 304. The print service 304 shown in FIG. 3 is just one of them.

Figure 7:
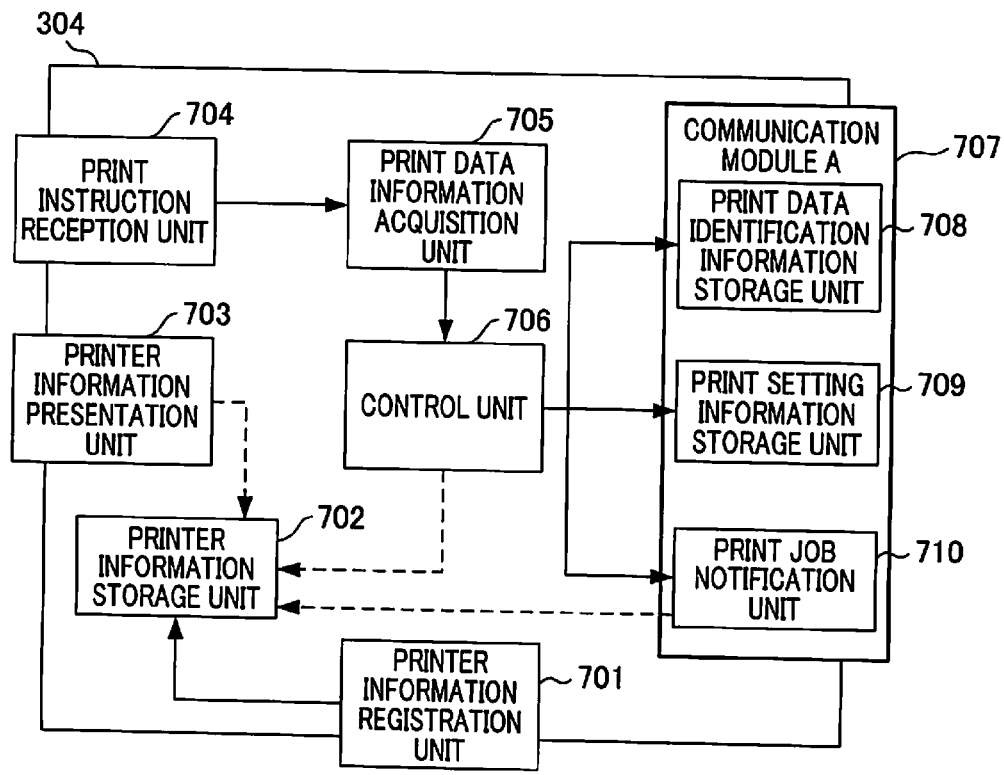
FIG. 7 is an exemplary functional block diagram illustrating a print service.

FIG. 7 is a functional block diagram illustrating the print service 304. The print service 304 includes a printer information registration unit 701, a printer information storage unit 702, a printer information presentation unit 703, a print instruction reception unit 704, a print data information acquisition unit 705, and a control unit 706. The printer information registration unit 701 receives user information from the print service printer generation unit 504. The printer information registration unit 701 reads user information stored in the Web application 306 of the Web application server group 105 and confirms whether or not received user information is present. If received user information is present, the printer information registration unit 701 determines that authentication is successful, receives a printer name, capabilities, and a VPID from the print service printer generation unit 504, and instructs the printer information storage unit 702 to store the received VPID.

Also, the printer information registration unit 701 issues an SPID corresponding to the VPID, and transmits the issued SPID to the printer information storage unit 702 and the print service printer generation unit 504. The printer information storage unit 702 stores the printer name, the capabilities, the VPID, the SPID, the user ID, and the password, and that are brought into association with each other. FIG. 8C is a diagram illustrating information stored in the printer information storage unit 702, where reference numerals 1401, 1402, 1403, 1404, 1405, and 1406 correspond to SPID, printer name, capabilities, VPID, user ID, and password, respectively. The other functions which have not previously been described will be described below. As described above, a description has been given of the function classified as the registration that registers the image forming device 101 in the print relay server 102 and realizes the relay virtual printer 303 within the print relay server 102 to thereby register the relay virtual printer 303 in the print service 304.

Next, a description will be given of the function classified as the print. Firstly, a description will be given of the function provided by the client 104. The client 104 has the Web browser 305. The Web browser 305 transmits a print instruction for the content stored in the Web application server group 105 to the Web application server group 105. Also, the Web browser 305 receives a command (i.e., redirect instruction) for accessing the print server group 103 from the Web application server group 105, and accesses the print server group 103 in accordance with the received redirect instruction. Also, the Web browser 305 acquires a view list of image forming devices that are printable by a user who is using the Web browser 305 from the accessed print server group 104 and displays the list.

FIG. 10C shows a print dialogue screen, in which a user selects a printable image forming device, that is displayed by the Web browser 305. The Web browser 305 acquires a print setting screen, which corresponds to the image forming device selected by the user, from the print server group 103 and displays the print setting screen. FIG. 10B shows a print setting screen corresponding to the image forming device, which is displayed by the Web browser 305, selected by a user. Also, the Web browser 305 transmits print setting values set by a user on the print setting screen to the print server group 103. The above description has been given of the Web browser 305 provided in the client 104.

Next, a description will be given of the function provided by the Web application server group 105. The Web application server group 105 has the Web application 306. The Web application server group 105 virtualizes a plurality of servers as a single server, and realizes the function of the Web application 306 by means of the single server. The Web application server group 105 activates a plurality of virtual machines in the single server, and causes each virtual machine to realize the function of the Web application 306.

The Web application 306 provides a document creation service. When a user wishes to distribute a material at the company's meeting, the user uses a document creation service for creating the material. When the client 104 uses the Web application 306, there is no need to install the Web application 306 on the client 104 but the client 104 may only have the Web browser 305. The Web application 306 transmits screen information required for creating the material to the Web browser 305. The Web application 306 performs authentication based on user information including the user ID and the password both input by a user via the Web browser 305, and sends screen information required for creating a material in response to the success of authentication. The Web browser 305 that has received the screen information displays a creation screen for creating a document based on the screen information and a user creates a material to be distributed at the meeting using the creation screen.

The Web application 306 receives information about the material created by a user using the creation screen, creates a content based on the received information, and causes the storage device for the Web application server group 105 to store the created content. Also the created content is stored in various formats. Examples of such format include a typical word processor document, spreadsheet document, and presentation document, PDF (Portable Document Format) format, and HTML (Hyper Text Markup Language) format. Note that the Web application 306 provides not only a document creation service but also a mail service and a schedule service.

Figure 12:
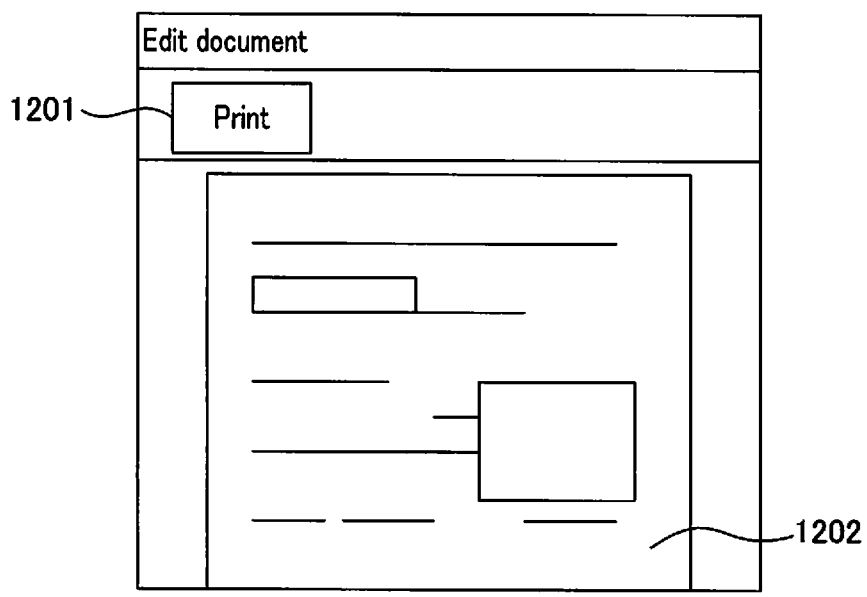
FIG. 12 shows a print button that has been pressed down.
Figure 13:
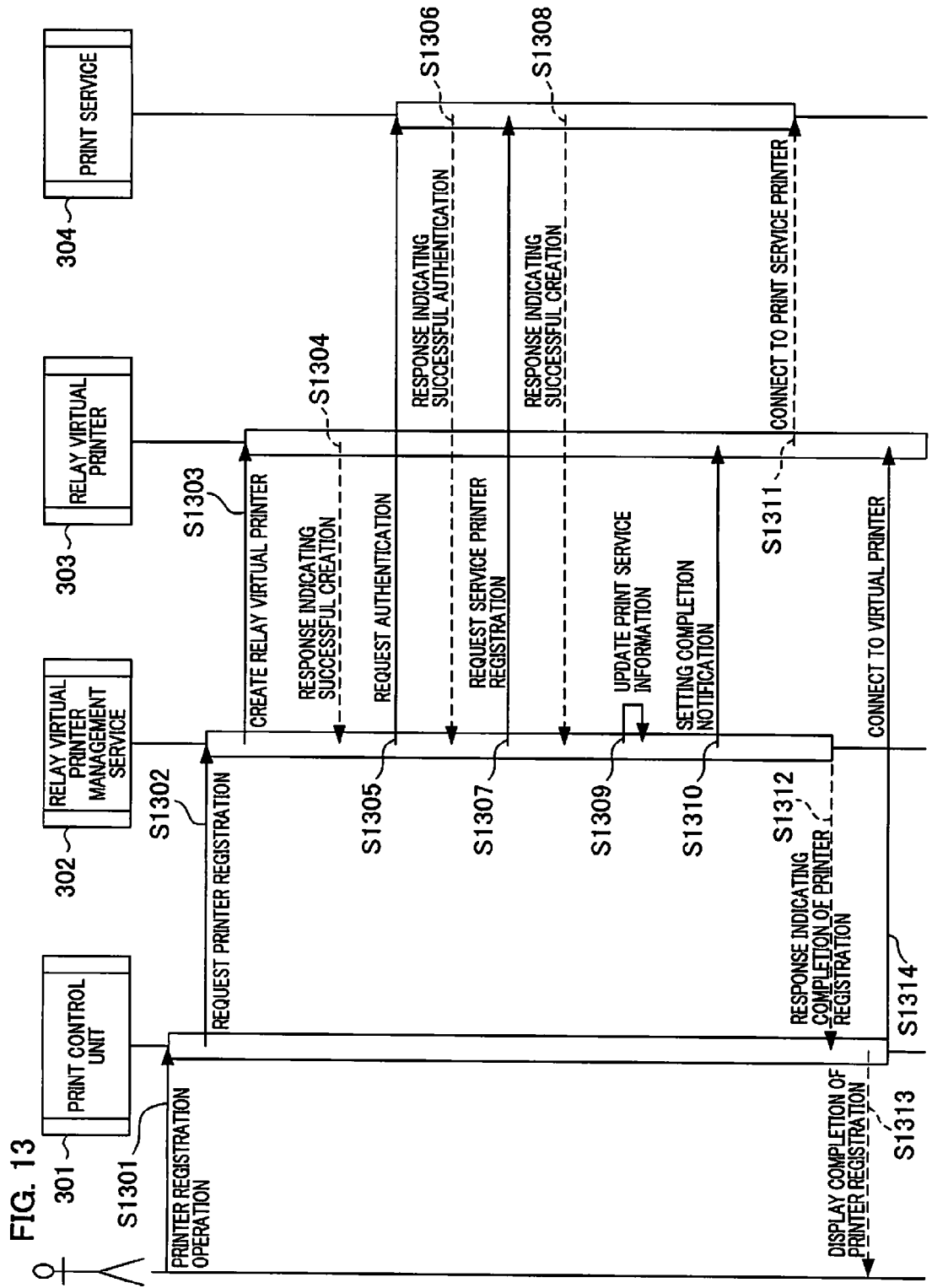
FIG. 13 shows processing for registering a relay virtual printer in a print service.

A user who wishes to print content created by using a document creation service presses down a print button displayed on the creation screen. FIG. 12 shows the fact that a print button 1201 has been pressed down. Note reference numeral 1202 denotes the content created by a user. The Web application 306 receives information indicating that the print button 1201 has been pressed down, and transmits a command for accessing the print server group 103 (i.e., a redirect instruction) to the Web browser 306. Note that a redirect instruction includes a request for acquiring the view list corresponding to a user who is using the Web browser 305 described above, content identification information for identifying a content to which a print instruction has been given by a user, and user information. Also, when a print data acquisition request is made from the print server group 103, the Web application 306 transmits print data identification information for identifying print data to the print server group 103. In the present embodiment, print data is a content in PDF format. Thus, print data identification information is identification information relating to a content in PDF format.

As described above, the Web application 306 provides not only a document creation service but also a mail service and a schedule service. The content created by these services provided by the Web application 306 is available from a program or a service provided by a third party via the interface of the Web application 306. Since the Web application 306 holds content in various formats, a content can be acquired in various formats through the interface. The above description has been given of the Web application 306 provided in the Web application server group 105.

Next, a description will be given of the function classified as the print provided by the print server group 103. As shown in FIG. 7, the print service 304 provided in the print server group 103 includes the printer information presentation unit 703. The printer information presentation unit 703 transmits the view list to the Web browser 305 in response to the view list acquiring request from the Web browser 305. The printer information presentation unit 703 specifies SPIDs and printer names stored in the printer information storage unit 702 based on user information. Then, the printer information provision unit 703 generates a view list of image forming devices available for use by a user based on the SPIDs and the printer names.

Also, the printer information presentation unit 703 receives the SPID of an image forming device selected from the view list by the user. The printer information presentation unit 703 specifies capabilities stored in the printer information storage unit 702 based on the received SPID, generates a print setting screen, and transmits the generated print setting screen to the Web browser 305. The printer information storage unit 702 generates the print setting screen shown in FIG. 10B based on information about capabilities shown in FIG. 8C. As shown in FIG. 10B, the printer information storage unit 702 generates a print setting screen in which only the print settings described in capabilities are selectable.

The print instruction reception unit 704 receives the print settings set by the user via the print setting screen and the SPID from the Web browser 305. Also, when an access is made from the Web browser 305 based on the redirect instruction, the print instruction reception unit 704 receives print data identification information for identifying print data to which a print instruction has been given by a user.

The print data information acquisition unit 705 receives print data identification information from the print instruction reception unit 704. Also, the print data information acquisition unit 705 receives the print settings input by a user and the SPID corresponding to the image forming device selected by the user from the print instruction reception unit 704. The control unit 706 acquires the print data identification information, the print settings, and the SPID from the print data information acquisition unit 705. The print settings are described in XML format as shown in FIG. 11B. Referring to FIG. 11B, it can be seen that the double-sided setting, the monochrome setting, and the paper size A4 are set by a user. The communication module A 707 can communicate with a device having the communication module A' 601 and is an interface for data communication between two devices. The communication module other than the communication module A' 601 cannot communicate with the communication module A 707. The reason for this will be described after the description of the function provided by the communication module A 707.

The communication module A 707 of the print service 304 includes a print data identification information storage unit 708, a print setting information storage unit 709, and a print job notification unit 710. The print data identification information storage unit 708 receives print data identification information from the control unit 706 and stores the received print data identification information. The print setting information storage unit 709 receives print settings from the control unit 706 and stores the received print settings. The print data identification information storage unit 708 and the print setting information storage unit 709 receive a storage instruction from the control unit 706 to thereby perform storage processing. The control unit 706 instructs the print job notification unit 710 to send notification information in response to the reception of an indication of the end of storage from the print data identification information storage unit 708 and the print setting information storage unit 709. The print job notification unit 710 acquires an SPID from the control unit 706 in response to the notification information transmission instruction from the control unit 706, and specifies a VPID based on information stored in the printer information storage unit 702. Information about the transmission destination corresponding to the SPID, i.e., the VPID of the transmission destination, is referred to as "target". In other words, a user specifies the VPID by selecting the SPID. Also, the print job notification unit 710 acquires the storage location of print data and the storage location of print settings from the control unit 706, generates notification information A, and transmits the notification information A to the registered image forming device.

The print job notification unit 710 corresponds to a first transmission unit, and information to be transmitted by the print job notification unit 710 corresponds to information relating to data. In the first embodiment, the information relating to data is the notification information A. However, the information relating to data may also include other information, other data, or the like depending on the communication specification. The same applies to notification information B to be described below. Also in the first embodiment, the registered image forming device refers to the relay virtual printer 303 corresponding to the VPID. The notification information A is described in XML format as shown in FIG. 11C. Reference numeral 1001 indicates the description of the storage location of print data and reference numeral 1002 indicates the description of the storage location of print settings.

Here, a description will be given of the reason why the communication modules other than the communication module A' cannot communicate with the communication module A. This is because the communication modules other than the communication module A' cannot interpret the notification information A which is transmitted by the print job notification unit 710 and is described in XML format. Another reason why communication modules other than the communication module A' cannot communicate with the communication module A is given in the following example. For example, when the communication module A does not have the print job notification unit 710 and causes the communication module A' to acquire print data and print settings in another way, the communication module A' which acquires the notification information A cannot acquire print data and print settings. This is because, since the communication module A' which acquires the notification information A is in a state of waiting for the notification information A from the communication module A, the communication module A' cannot acquire print data and print settings unless the communication module A' is notified of the notification information A.

The communication module A' capable of communicating with the communication module A needs to have a query function for querying the communication module A to inquire whether or not data to be acquired is present. In this manner, there may also be a case where communication cannot be established between the communication module A and the communication module A' due to the fact that the communication module A' does not correspond to the data communication standard of the communication module A. A structure for enabling communication between the communication module A and the communication module A' is referred to as the "specification" of a vendor who provides the print server group 103. Then, the specification strongly depends on the vendor managing the print server group 103.

The vendor managing the print server group 103 discloses the communication module A' that communicates with the communication module A by implementing the communication module A in the print server group 103. In fact, such a system is being established in recent years and the vendor managing the print server group 103 discloses a proprietary specification for performing data communication between the print server group 103 and the device. In order to establish communication between the image forming device 101 and the print server group 103, the device vendor of the image forming device 101 must install the communication module A' on the image forming device 101. Assume that the vendor managing the print server group 103 changes the configuration of the communication module A. In other words, assuming that the vendor managing the print server group 103 changes the specification, the device vendor must change the communication module A' of the image forming device 101 in accordance with the changes in the specification. However, such an operation burden is very high. The reason for this is that image forming devices are arranged in various customer environments and thus service persons must visit various customer environments so as to change the communication module A' in order to establish communication between the print server group 103 and the image forming devices again.

Although another solution that distributes the communication module A' without using a service person may also be considered, such solution places a load on a communication band because the communication module A' must be distributed to a plurality of image forming devices. However, above possibility is solved by using the function classified as the print provided by the print relay server 102 to be described below. The specification for data communication disclosed by the vendor managing the print server group 103 corresponds to a first specification. The interface of the communication module A and the communication module A' is an interface that is generated in accordance with the first specification.

Figure 6:
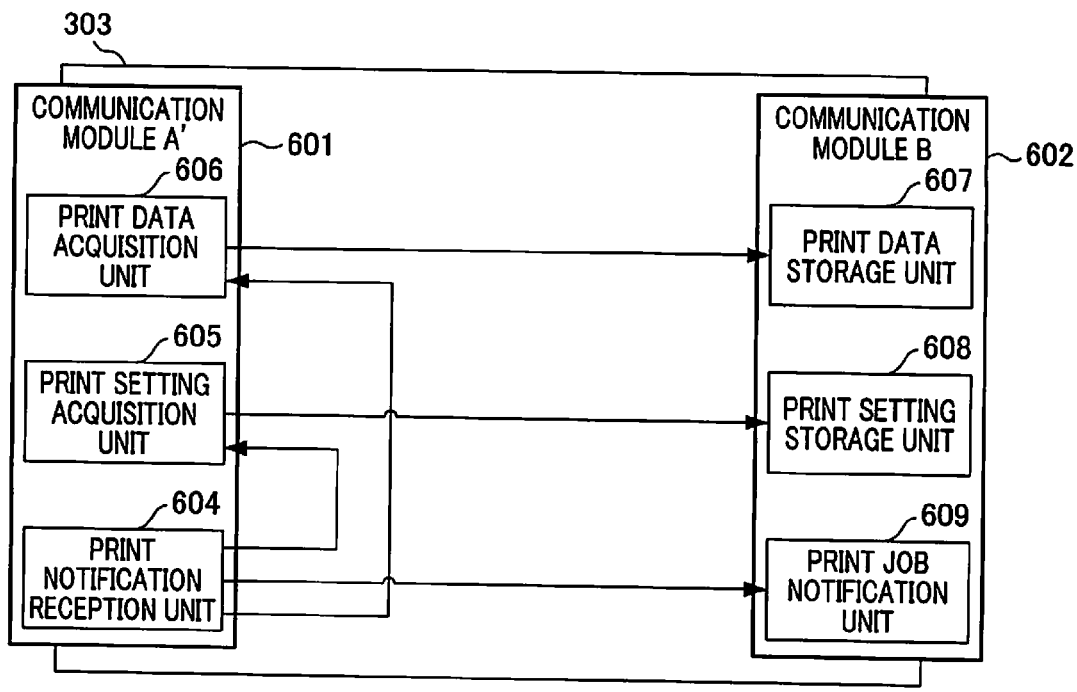
FIG. 6 is an exemplary functional block diagram illustrating a relay virtual printer.

Next, a description will be given of the function classified as the print provided by the print relay server 102. As shown in FIG. 6, the relay virtual printer 303 has the communication module A' 601 and the communication module B 602. The communication module A' 601 includes a print notification reception unit 604, a print setting acquisition unit 605, and a print data acquisition unit 606. The communication module B 602 includes a print job notification unit 609, a print setting storage unit 608, and a print data storage unit 607. The print notification reception unit 604 of the communication module A' 601 receives the notification information A transmitted from the print job notification unit 710. Since the relay virtual printer 303 is registered instead of the RPID of the image forming device 101 in the print service 304, the notification information A is transmitted to the print notification reception unit 604. Since the communication module A' is a module that is a one-to-one correspondence with the communication module A, the print notification reception unit 604 is capable of interpreting the notification information A. The print notification reception unit 603 corresponds to a first acquisition unit.

The print notification reception unit 604 confirms the storage location of print data and the storage location of print settings both described in the notification information A, and notifies the print setting acquisition unit 605 and the print data acquisition unit 606 of the information. The print setting acquisition unit 605 acquires print settings from the print setting information storage unit 709 based on the notified storage location of print settings. The print data acquisition unit 605 acquires print data from the print data identification information storage unit 708 based on the notified storage location of print data.

The print data acquisition unit 605 instructs the print data storage unit 607 to store print data acquired by the print data acquisition unit 605. The print setting acquisition unit 605 instructs the print setting storage unit 608 to store the print settings acquired by the print setting acquisition unit 605. The print data storage unit 607 that has stored print data notifies the print job notification unit 609 of the storage location of print data. The print setting storage unit 608 that has stored the print settings notifies the print job notification unit 609 of the storage location of the print settings. The print job notification unit 609 generates the notification information B in response to the reception of the notification of the storage locations from the print data storage unit 607 and the print setting storage unit 608. The notification information B is described in XML format as shown in FIG. 10D. Reference numeral 1003 indicates the description of the storage location of print data, and reference numeral 1004 indicates the description of the storage location of print settings. The print job notification unit 609 transmits the notification information B to the print control unit 301. The print job notification unit 609 corresponds to a second transmission unit. As described above, the communication module A' 601 serving as the former communication module passes print data and print settings to the communication module B 602 serving as the latter communication module to thereby realize communication between modules.

The image forming device 101 implements the communication module B' corresponding to the communication module B. As described above, the image forming device 101 acquires print data from the print service 304. With this arrangement, even if the communication module A' changes in accordance with the change in the communication module A, notification information can be transmitted to the image forming device 101 by changing the communication module A' of the print relay server 102. In other words, even if the vendor managing the print server group 103 changes a proprietary specification for performing data communication between the print server 103 and the image forming device 101, there is no need for the device vendor to change the communication module of the image forming device 101. The device vendor can establish communication between the image forming device 101 and the print server group 103, which are arranged in various user environments, by changing the relay virtual printer 303 of the print relay system. As a method for changing the relay virtual printer 303, not only a method for changing the communication module A' of the relay virtual printer 303 but also a method for newly generating the relay virtual printer 303 by discarding the existing relay virtual printer 303 may be considered.

Figure 4:
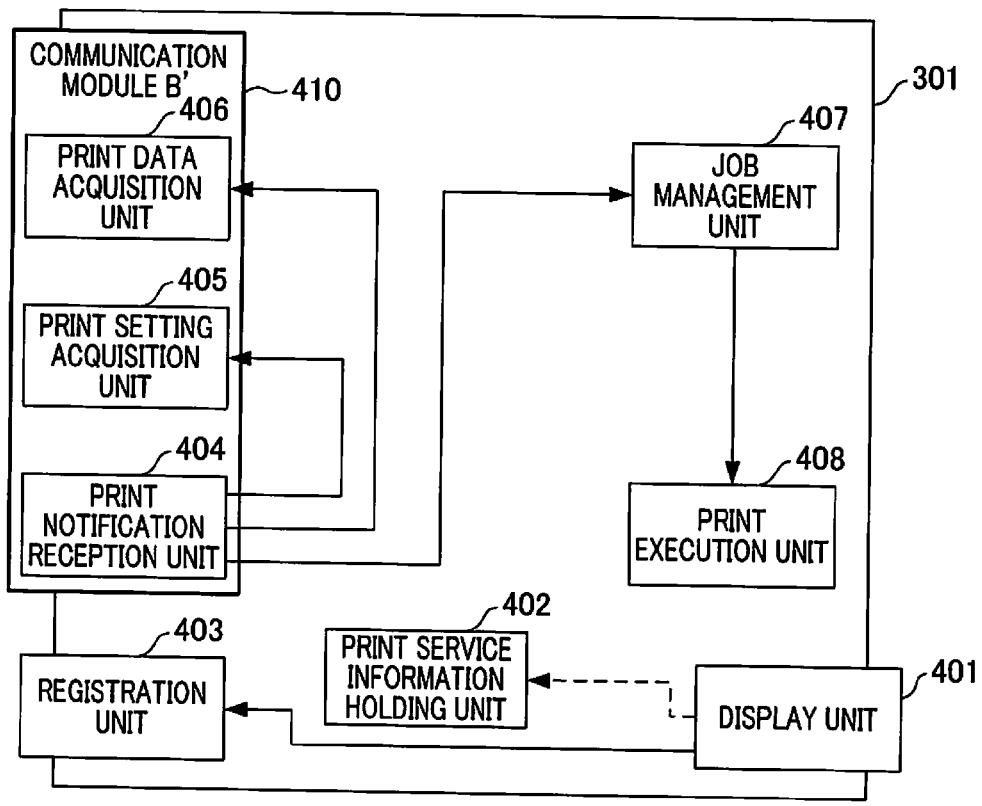
FIG. 4 is an exemplary functional block diagram illustrating print control unit.

Next, a description will be given of the function classified as the print provided by the image forming device 101. As shown in FIG. 4, the print control unit 301 has the communication module B' 410. The communication module B' 410 includes a print notification reception unit 404, a print setting acquisition unit 405, and a print data acquisition unit 406. The print notification reception unit 404 receives the notification information B transmitted from the print job notification unit 609. The print notification reception unit 404 corresponds to a second acquisition unit. Since the communication module B' 410 is a module that is a one-to-one correspondence with the communication module B 602, the print notification reception unit 404 is capable of interpreting the notification information B. The specification defined by a device vendor in order to perform data communication between the relay virtual printer 303 and the image forming device 101 corresponds to a second specification that can be handled by the device vendor. The interface of the communication module B and the communication module B' is an interface that is generated in accordance with the second specification.

The print notification reception unit 404 confirms the storage location of print data and the storage location of print settings both described in the notification information B and notifies the print setting acquisition unit 405 and the print data acquisition unit 406 of the information, respectively. The print setting acquisition unit 405 acquires print settings from the print setting storage unit 608 based on the notified storage location of print settings. The print data acquisition unit 406 acquires print data from the print data storage unit 607 based on the notified storage location of print data. The acquired print settings and print data are transmitted to a job management unit 407 via the print notification reception unit 404. The job management unit 407 acquires print data and print setting information and instructs a print execution unit 408 to execute printout. The instructed print execution unit 408 generates a raster image based on print settings and print data, and instructs a print unit to print the generated raster image. The above description has been given of the function classified as the print in which a print instruction of the content generated by the Web application server group 105 is transmitted to the print server group 103 and print data transmitted from the print relay server 102 is printed by the image forming device 101.

Next, a description will be given of processing for registering the image forming device 101 in the print relay server 102 and realizing the relay virtual printer 303 within the print relay server 102 to thereby register the relay virtual printer 303 in the print service 304.

Firstly, in step S1301, a user selects a print service desired to be registered from the UI of the image forming device 101 and inputs a user ID and a password. In step S1302, the registration unit 403 of the print control unit 301 requests the request reception unit 501 of the relay virtual printer management service 302 to register a printer. At this time, the registration unit 403 of the print control unit 301 transmits the registration information to the relay virtual printer management service 302.

In step S1303, the control unit 502 of the relay virtual printer management service 302 receives the registration information from the request reception unit 501. The control unit 502 instructs the virtual printer generation unit 503 to realize the relay virtual printer 303 based on the received registration information. In step S1304, the relay virtual printer 303 transmits a response indicating a successful creation to the virtual printer generation unit 503. The virtual printer generation unit 503 that has received a response indicating a successful creation creates a VPID. In step S1305, the print service printer generation unit 504 of the relay virtual printer management service 302 transmits the user ID and the password to the printer information registration unit 701 of the print service 304 to thereby receive authentication. When the authentication performed by the printer information registration unit 701 was successful, the printer information registration unit 701 transmits the fact that authentication was successful to the print service printer generation unit 504 in step S1306.

In step S1307, the print service printer generation unit 504 requests the print service 304 to register the VPID as a printer (service printer) to be provided to the user. In step S1308, the printer information registration unit 701 of the print service 304 issues an SPID in response to the registration of the VPID as a service printer, and transmits the SPID to the print service printer generation unit 504.

In step S1309, the control unit 502 of the relay virtual printer management service 302 receives the VPID and the SPID from the virtual printer generation unit 503 and the print service printer generation unit 504, respectively. Then, the control unit 502 instructs the print service information management unit 505 to store/update the received VPID and SPID. In step S1310, the print service information update unit 507 that has received the instruction from the control unit 502 instructs the printer information registration unit 701 to store the updated SPID, and transmits the fact that the settings have been completed to the relay virtual printer 303. In step S1311, the relay virtual printer 303 is connected to the communication module A of the print service 340 based on the SPID, and waits for the notification information A to be transmitted.

In step S1312, the request reception unit 501 of the relay virtual printer management service 302 notifies the registration unit 403 of the print control unit 301 of the fact that the printer registration has been completed. In step S1313, the display unit 401 of the print control unit 301 instructs the UI of the image forming device 101 to display the fact that the image forming device registration has been completed. In step S1314, the print control unit 301 is connected to the communication module B based on the VPID, and waits for the notification information B to be transmitted. The above description has been given of registration processing.

Figure 14:
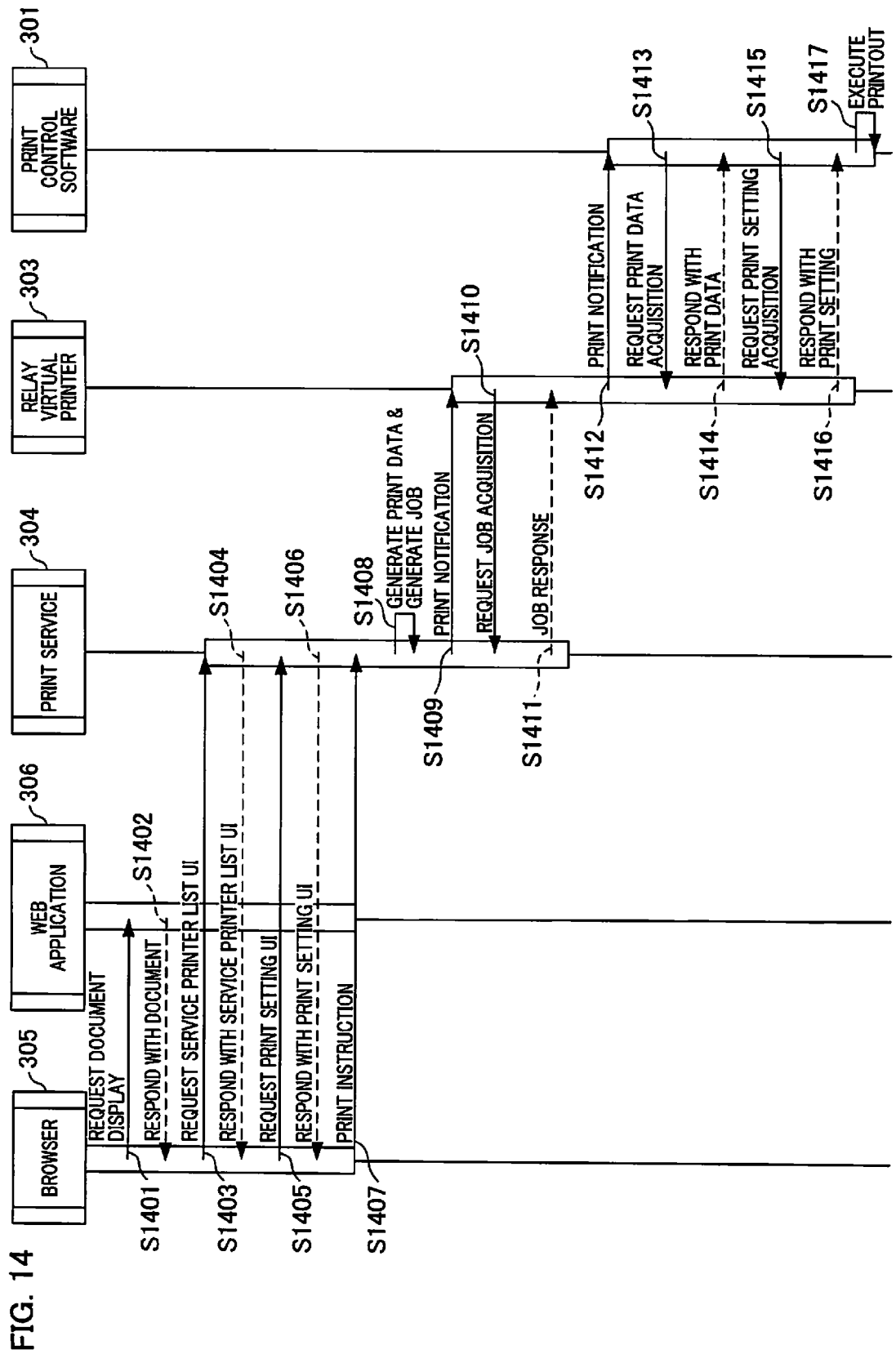
FIG. 14 shows processing until an image forming device prints out print data after a print instruction is given.

Next, a description will be given of processing for transmitting a print instruction for the content generated by the Web application server group 105 to the print server group 103 to thereby cause the image forming device 101 to print out print data transmitted from the print server group 103 with reference to FIG. 14. Firstly, in step S1401, the Web browser 305 requests the Web application 306 to display the content which a user wishes to edit. In step S1402, the Web application 306 transmits the screen for the content corresponding to the requested content to the Web browser 305. In step S1403, the Web browser 305 requests a list screen of image forming devices (service printers) registered in the print service 304 in response to the print instruction given by a user via the screen for the content.

In step S1404, the printer information presentation unit 703 of the print service 304 transmits a list screen of service printers corresponding to a user who is using the Web browser 305 to the Web browser 305. In step S1405, the Web browser 305 requests a print setting screen corresponding to the selected image forming device in response to the selection of an image forming device from the list screen by a user. In step S1406, the printer information presentation unit 703 transmits the print setting screen to the Web browser 305. In step S1407, the Web browser 305 transmits the print settings input by a user via the print setting screen to the print instruction reception unit 704 of the print service 304.

In step S1408, the print data information acquisition unit 705 acquires identification information about print data to which a print instruction has been given by a user from the Web application 306. Also, the control unit 706 generates a job by combining identification information about print data and print settings. In step S1409, the print job notification unit 710 notifies the print notification reception unit 604 of the relay virtual printer 303 of the fact that the job has been generated.

In step S1410, the print data acquisition unit 606 and the print setting acquisition unit 605 of the relay virtual printer 303 request the print data identification information storage unit 708 and the print setting information storage unit 709 of the print service 304 to acquire a job. In step S1411, the print data acquisition unit 606 and the print setting acquisition unit 605 acquire a job, i.e., print data and print settings from the print data identification information storage unit 708 and the print setting information storage unit 709 of the print service 304. In step S1412, the print job notification unit 609 of the relay virtual printer 303 notifies the print notification reception unit 404 of the print control unit 301 of the fact that the job has been generated.

In step S1413, the print data acquisition unit 406 of the print control unit 301 requests the print data storage unit 607 of the relay virtual printer 303 to acquire print data. In step S1414, the print data acquisition unit 406 acquires print data from the print data storage unit 607. In step S1415, the print setting acquisition unit 405 requests the print setting storage unit 608 to acquire print settings. In step S1416, the print setting acquisition unit 405 acquires the print settings from the print setting storage unit 608. In step S1417, the print control unit 301 renders a raster image based on the acquired print settings and print data, and causes the image forming device 101 to print the raster image.

The description has been given with respect to the first half of the first embodiment. In the following second half, a description will be given of the development function by developing the basic function consisting of two groups described in the first half. The basic function described in the first half consists of two groups: 1. registration function and 2. print function, and is premised on the assumption that a user newly utilizes the system. However, there is often a case that such premise may not be satisfied. One example of such cases is the case where there is a printer that has already been connected to a print service.

Examples of a printer that has already been connected to a print service include a "printer having a dedicated interface implemented" or a "printer connected to a proxy PC having a dedicated interface implemented". When a new printer is registered in the print service 304, the new printer can be registered via a print relay server as described in the first half, whereas a printer that has already been connected to the print service 304 is registered without a detour through a print relay server. For this reason, the print relay server cannot integrally manage the usage state of printers that have already been connected to the print service 304 so that information collection or "management based on an experience value such as print suppression" cannot be made. An example of such "management based on an experience value such as print suppression" includes the settings of an upper limit value for the number of copies for each user. By taking all the printers a detour through the print relay server, an experience value for a print status for each user can be acquired so that a print restriction can be imposed on all the printers based on the values.

Accordingly, a "printer having a dedicated interface implemented" or a "printer connected to a proxy PC having a dedicated interface implemented" is re-registered via a print relay server with the aid of the development function to be described below. In this manner, the relay virtual printer service 302 can integrally manage the usage states of printers.

Firstly, the summary of the development function will be clarified. With the aid of the development function disclosed by the present invention, a "printer having a dedicated interface implemented" or a "printer connected to a proxy PC having a dedicated interface implemented" can be registered in a print relay server to execute printing. By taking a detour through a print relay server, use information can be integrally managed so that information collection and "management based on an experience value such as print suppression" can be made. The aforementioned description has been given with respect to the summary of the development function.

Figure 15:
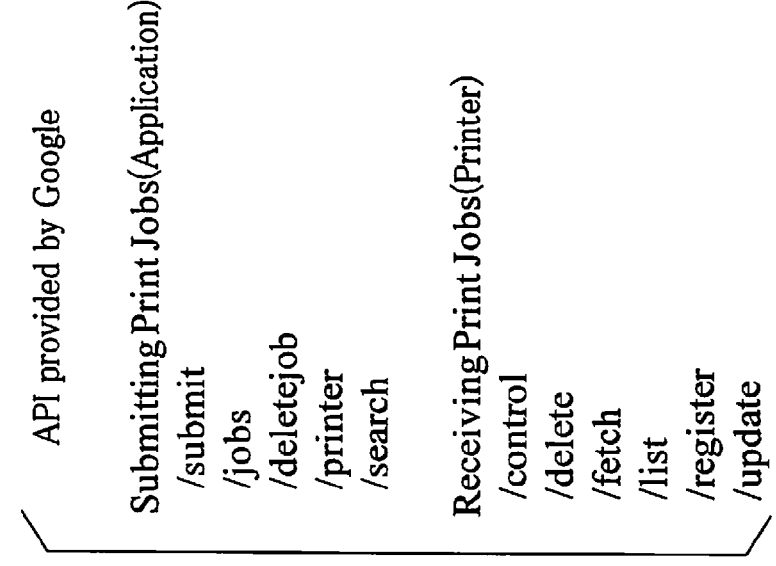
FIGS. 15A and 15B show an API provided by Google (registered trademark) and processing for registering an unregistered printer.

Here, a description will be given of the print system 1000 employing the development function. GCP (Google Cloud Print (registered trademark)) which is one of print services discloses the API (Application Programming Interface) shown in FIG. 15A. There are two types of APIs: the application API for "Submitting Print Jobs" and the printer API for "Receiving Print Jobs". The development function will be described by taking an example of GCP. The relay virtual printer management service 302 re-registers a "printer having a dedicated interface implemented" or a "printer connected to a proxy PC having a dedicated interface implemented" via the print relay server 102 using the API for GCP. The flow is shown in FIG. 15B.

Firstly, in step S2001, the control unit 502 of the print relay server 102 requests (/searches) the SPID List of printers registered in the print service 304 via the print service information update unit 507. In step S2002, the control unit 502 requests the List of registered printers (SPIDs) to the printer information registration unit 701 of the print service 304. The printer information registration unit 701 that has received the request acquires the List of registered printers from the printer information storage unit 702, and passes the List to the print service information update unit 507. In other words, the print service information update unit 507 and the control unit 502 collectively function as an acquisition unit that acquires printer information linked to a user registered in a print service. In step S2003, the control unit 502 extracts printers not managed by the print service information management unit 505 from among the List of registered printers acquired by the print service information update unit 507 in step S2002. In other words, the control unit 502 functions as a specification unit that specifies unregistered printer information. How the extraction process is performed will be described below. The control unit 502 repeats the following processing for the number of extracted printers.

In step S2004, the control unit 502 requests the VPID (/printer (SPID)) to the printer information registration unit 701 using the SPID via the print service information update unit 507. In the case of a "printer having a dedicated interface implemented", the MAC address of the printer itself is typically used as the VPID. This is because the VPID is information for identifying a printer and the MAC address which is a value specific to each printer is suitable for the VPID. In the case of a "printer connected to a proxy PC having a dedicated interface implemented", the MAC address of the "proxy PC" is used as the VPID. In this case, when a plurality of printers is connected to a proxy PC, the VPID common to the plurality of printers is set. In step S2005, the control unit 502 acquires the VPID from the printer information storage unit 702. The aforementioned processing is performed using the application API for "Submitting Print Jobs".

In the subsequent processing, the relay virtual printer management service 302 uses the printer API for "Receiving Print Jobs". In step S2006, the control unit 502 of the print relay server 102 requests printer information (/list (VPID)) to the printer information registration unit 701 of the print service 304 using the VPID acquired in step S2005. In step S2007, the control unit 502 acquires printer information from the printer information registration unit 701.

Here, printer information is the printer name 1402 and the capabilities 1403 which are managed by the table shown in FIG. 8C. In step S2008, the control unit 502 updates the table using the printer information acquired in step S2007. At this time, the VPID created by the relay virtual printer management service 302 is used. In the present embodiment, the MAC address of the relay virtual printer management service 302 itself is intended to be used.

In step S2009, a printer is registered using the VPID (/register (VPID, capabilities)). In step S2010, the control unit 502 receives an SPID as a response of registration. In step S2011, registration in the "proxy that has been previously used in the registered printer" is deleted (/delete (SPID)). In step S2013, the table is updated so as to reflect the deleted printer.

The aforementioned description has been given of the summary of the flow in which a "printer having a dedicated interface implemented" or a "printer connected to a proxy PC having a dedicated interface implemented" is re-registered via a print relay server using the API for GCP.

Next, a detailed description will be given of the content of the development function with reference to FIG. 16 and FIG. 17. When the development function is applied, information stored in the printer information storage unit 702 of the print service 304 is as shown in the table in FIG. 9C1. The table shown in FIG. 9C1 corresponds to the table shown in FIG. 8C in the basic function. The "Printer C" (801) and the "Printer D" (802) are registered in the print service 304 without a detour through the print relay server 102. More specifically, the Printer C is a "printer having a dedicated interface implemented" and the Printer D is a "printer connected to a proxy PC having a dedicated interface implemented".

Figure 16:
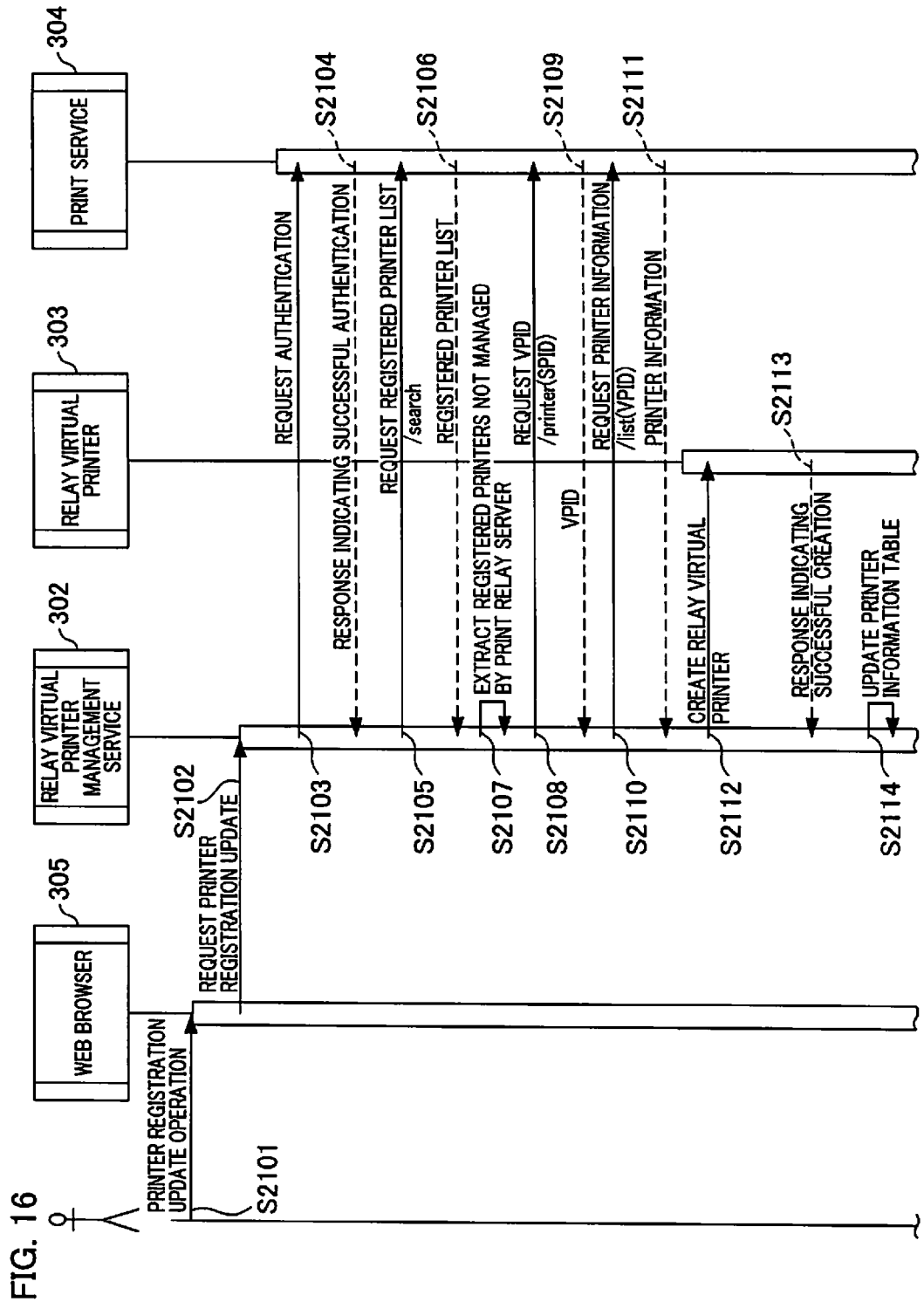
FIG. 16 shows the more detailed processing of the processing shown in FIG. 15B.
Figure 17:
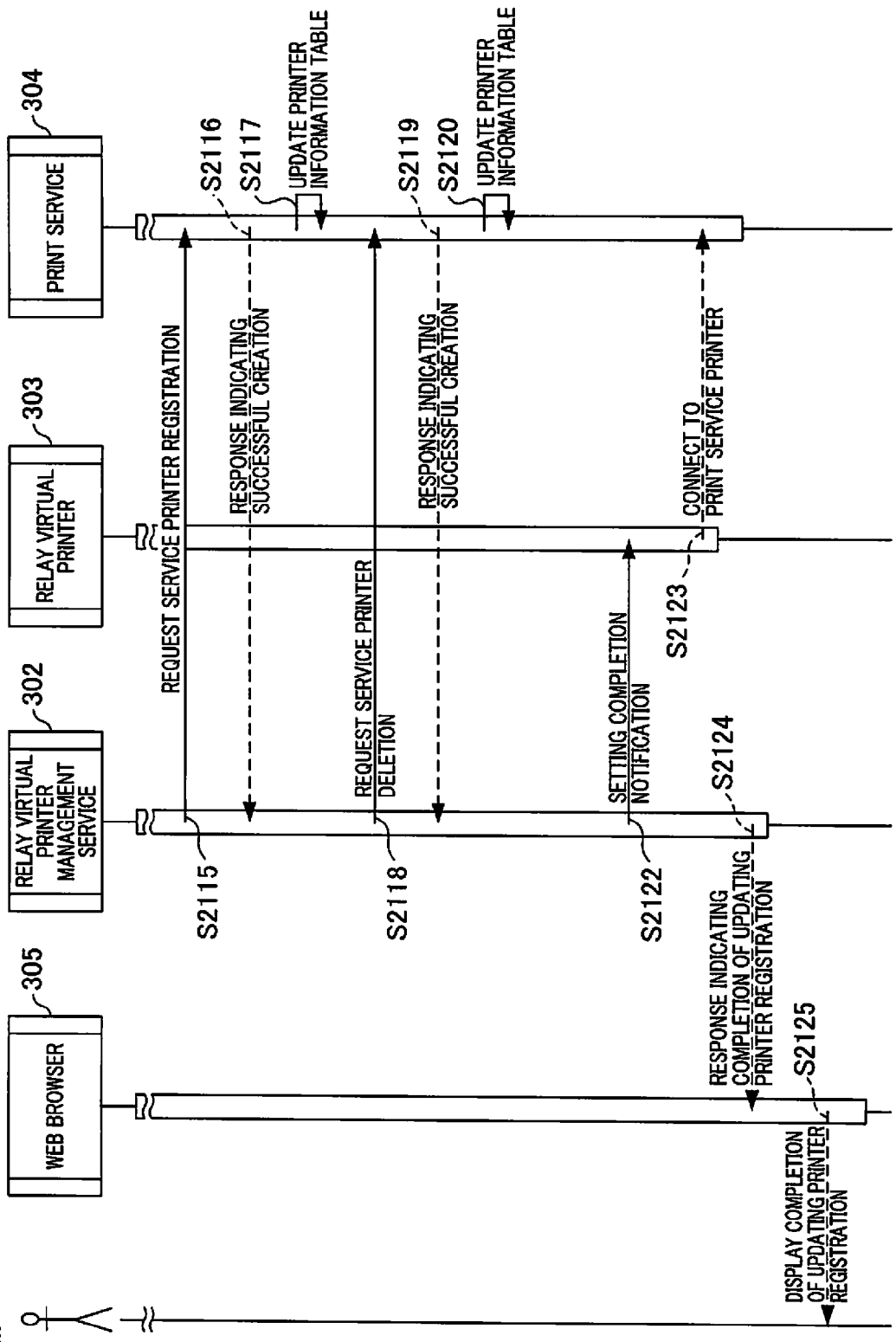
FIG. 17 shows the more detailed processing of the processing shown in FIG. 15B.

Printer registration update processing in the development function is shown in FIG. 16 and FIG. 17. Firstly, in steps S2101 and S2102, a user requests the request reception unit 501 of the relay virtual printer management service 302 to update printer registration via the Web browser 305 of the client computer 104. In step S2103, the print service information update unit 507 of the relay virtual printer management service 302 requests authentication to the print service 304. In step S2104, the print service information update unit 507 acquires an authentication token as an authentication success response.

In step S2105, the control unit 502 requests (/searches) the printer information registration unit 701 of the print service 304 to obtain the List of registered printers linked to a user using the authentication token via the print service information update unit 507. In step S2106, the printer information registration unit 701 of the print service 304 transmits the List of registered printers to the printer information storage unit 702. The printer List to be transmitted is the SPIDs managed by the table shown in FIG. 9C1. All the SPIDs linked to a user managed by the table are returned. In the case of the table shown in FIG. 9C1, the number of SPIDs is seven. More specifically, examples of SPIDs include "SP-3KM15KEG-892E", "SP-II3KI93KEE-343D", "SP-5D15DEAF-BE3C", "SP-2336ACD3-4D27", "SP-1AE5A901-3D8C", "SP-F5C17CC0-1877", and "SP-4120C0A0-99A3".

In step S2107, the control unit 502 of the relay virtual printer management service 302 extracts printers not included in the table shown in FIG. 8B stored in the print service information management unit 505 from among the acquired List of registered printers. The printers to be extracted in the present embodiment are the Printer C (801) which is a "printer having a dedicated interface implemented" and the Printer D (802) which is a "printer connected to a proxy PC having a dedicated interface implemented".

In step S2108, the control unit 502 requests the VPID (/printer (SPID)) to the printer information registration unit 701 of the print service 304 using the SPID acquired in step S2107 via the print service information update unit 507. In step S2109, the printer information registration unit 701 returns a VPID corresponding to the SPID. In step S2110, the control unit 502 requests printer information using the acquired VPID (/list (VPID)). In step S2111, the printer information registration unit 701 returns printer information such as capabilities, print setting specified values, and the like, which are linked to the VPID using information shown in FIG. 9C1, via the printer information storage unit 702. Here, the printer information registration unit 701 returns printer information relating to the Printer C and the Printer D. In step S2112, the virtual printer generation unit 503 of the relay virtual printer management service 302 requests the relay virtual printer 303 to create a relay virtual printer based on information about the Printer C and the Printer D acquired in step S2111. In other words, the virtual printer generation unit 503 requests the relay virtual printer 303 to create a virtual printer corresponding to each printer which is not managed by the print relay server 303 from among the acquired printer list. For example, in the present embodiment, the acquired VPID shown in FIG. 9C1 by the Printer C is a "Printer C's MAC Address", and thus, the control unit 502 specifies that the Printer C is a printer that has not yet been managed. Then, the virtual printer generation unit 503 transmits information about the Printer C to the relay virtual printer 303, and requests the relay virtual printer 303 to create a virtual printer having a VPID which can be managed by the relay virtual printer management service 302. Consequently, a virtual printer having the value of "VPBCH-2531CB19-5D9E" is generated with respect to the Printer C as shown in FIG. 8B1. The relay virtual printer management service 302 performs the same processing for the Printer D.

In step S2113, the relay virtual printer 303 returns a response indicating a successful creation to the virtual printer generation unit 503. Upon receiving the response, the virtual printer generation unit 503 creates a VPID. The VPID corresponds to a printer identification name for a print relay device. In step S2114, the control unit 502 of the relay virtual printer management service 302 updates information managed by the print service information management unit 505. The updated table is shown in FIG. 8B1. Information relating to printer name, i.e., the Printer C (803) and the Printer D (804) is added. To be noted here is that the VPID is updated to the value created by the relay virtual printer 303. As shown in reference numerals 801 and 802 in FIG. 9C1, the MAC address of a printer or a PC is used for the VPIDs of the Printer C and the Printer D that are registered in the print service 304 without a detour through the print relay server 102.

Information (e.g., MAC address which is information about an output destination) relating to a printer registered without a detour through the print relay server 102, which has been acquired based on the printer ID issued by the print server group 103 upon registration of printer information, is used. In this manner, registration information is managed by changing the output destination as viewed from the print server group 103 to the print relay server 102 and by making print data transmitted from the print server group 103 reach the image forming device 101 serving as the final output destination. Consequently, the image forming device 101 can benefit from a service provided by the print server group 103 to the same extent as prior to change. Furthermore, data from the print server group 103 is exchanged via the print relay server 102, resulting in a drastic improvement in ease of management of a printer having a dedicated interface implemented as compared to prior to change.

In addition, since printer information other than the output destination remains the same as those prior to change, the relay virtual printer management service 302 can set print setting values, which can be set on the print setting screen displayed on the user device, as in a conventional way. However, the form is not necessarily limited to this. For example, the relay virtual printer management service 302 may replace printer information other than the output destination with other values. For example, When a print restriction is applied to a user registered in a print relay server, the settings in which both 1-side printing and 2-side printing can be performed can be replaced with the settings in which only 2-side printing can be performed. Also, the settings can be made such that the relay virtual printer management service 302 manages the frequency of usage of printers and the printers are displayed on the print setting screen in the ascending or descending order depending on the frequency of usage.

In step S2115, the control unit 502 requests service printer registration to register the relay virtual printers of the Printer C and Printer D created in steps S2112 to S2114 in the print service 304 via the print relay server 102. In step S2116, the printer information registration unit 701 returns the SPID as a response indicating successful creation to the print service information update unit 507. In step S2117, the print service 304 updates the printer information table managed by the printer information storage unit 702. The updated table is shown in FIG. 9C2. Information about the Printer C (805) and Printer D (806) is newly added. The newly added rows have the same VPIDs as those shown in FIG. 8B1, i.e., the VPIDs created in step S2113 (805) (806). At this point, the rows of the Printer C (807) and the Printer D (808) registered without a detour through the print relay server 102 still remains.

In step S2118, the control unit 502 requests the printer information registration unit 701 to delete the service printers of the Printer C (807) and the Printer D (808), which have been registered without a detour through the print relay server 102, via the print service information update unit 507. In step S2119, the printer information registration unit 701 returns a response indicating successful creation. In other words, the control unit 502 functions as a registration unit that additionally register printer information, in which information relating to the transmission destination in printer information has been replaced by information to be transmitted to the relay virtual printer management service 302, in the print service 304.

By executing the processing, the printers that has not been managed by the print service information management unit 505 prior to execution of the processing are placed under control of the print service information management unit 505. In other words, information about the non-managed printers that have already been registered prior to the processing is no longer necessary. Hence, the SPIDs corresponding to the non-managed printers that have already been registered prior to the processing are deleted.

The reason for this is to prevent the non-managed printers that have already been registered prior to the processing and the old non-managed printers that have been placed under control of the relay virtual printer management service 302 by executing the processing from being simultaneously displayed on the printer selection screen provided to a user. Another reason for this is to reduce the resource amount of the print service 304. Note that the non-managed printers that have already been registered prior to the processing are printers that are found not to be managed by the relay virtual printer management service 302 based on the acquired printer list and the printers that have been placed under control of the relay virtual printer management service 302 are printers that have already been registered in the print service 304 and were not managed by the relay virtual printer management service 302. More specifically, a printer that has been placed under control of the relay virtual printer management service 302 is a printer that has newly re-registered in the print service 304 by changing information about an output destination to information about an output destination to the relay virtual printer management service 302.

In step S2120, the printer information storage unit 702 of the print service 304 updates the printer information table for management. The updated table is shown in FIG. 9C3. The rows of the Printer C (807) and the Printer D (808) registered without a detour through the print relay server 102 are deleted.

In step S2122, the control unit 502 of the relay virtual printer management service 302 instructs the printer information registration unit 701 to store the SPID, and transmits the fact that the settings have been completed to the relay virtual printer 303. In step S2123, the relay virtual printer 303 is connected to the communication module A of the print service 304 based on the SPID, and waits for the notification information A to be transmitted. In step S2124, the request reception unit 501 of the relay virtual printer management service 302 notifies the registration unit 403 of the print control unit 301 of the fact that the printer registration has been completed. In step S2125, the Web browser 305 displays a screen indicating to the user that registration of the image forming device 101 has been completed.

The aforementioned description has been given of the flow in which a "printer having a dedicated interface implemented" or a "printer connected to a proxy PC having a dedicated interface implemented" is re-registered via the relay virtual printer management service 302. In this way, a conventional printer, a "printer having a dedicated interface implemented", and a "printer connected to a proxy PC having a dedicated interface implemented" are registered in the relay virtual printer management service 302 via the print relay server 102. All the printing passes through a print relay server so that information can be collected. Consequently, management for print restriction based on experience values, default printer settings, or the like can be made by collecting information. In other words, according to the print relay device of the present invention, the print relay device acquires printer information from a print service device and integrally manages printers not managed by the print relay device. Thus, management for print restriction, default printer settings, or the like can be made based on the collected information, and thus, all the printers can be managed or services can be provided to all the printers.

Although the registration processing is triggered by printer registration update operation by a user via the Web browser 305, the registration processing may be performed by polling by the relay virtual printer management service 302. By repeating steps S2105 to S2124 by the relay virtual printer management service 302 for each predetermined period, an unregistered printer can be surely registered in the print service 304 via the relay virtual printer management service 302 for each predetermined period. The registration processing may also be performed each time the relay virtual printer management service 302 is in operation for registration processing or print processing. By repeating the processes in steps S2105 to S2124 each time an inquiry is made from the print service 304 or the print control unit 301 or each time the relay virtual printer management service 302 operates in response to the relay virtual printer, the burden of operation processing may occur. However, the period during which a "printer having a dedicated interface implemented" or a "printer connected to a proxy PC having a dedicated interface implemented" is not registered in the print relay server 102 can be shortened. Alternatively, the registration processing may also be triggered by an event output by the print service 304 each time the registration is changed. In order to do this, the function for outputting an event each time the registration is changed to GCP is required. However, if the function is prepared, printers not managed by the relay virtual printer service 302 can be registered immediately in the relay virtual printer management service 302 without exception at the timing of the event reception by the relay virtual printer management service 302. The processes in steps S2105 to S2124 are performed at the timing of the event reception.

Second Embodiment

In the relay virtual printer management service 302, the MAC address of the relay virtual printer management service 302 itself can also be commonly used as the VPID. However, the print service 304 has the case in that "registering a plurality of printers with a single VPID is undesirable in terms of performance". In this case, the control unit 502 of the relay virtual printer management service 302 may manage a plurality of printers by grouping using a plurality of VPIDs. For example, a plurality of VPIDs is provided to a single user for management instead of providing a single VPID to a single user. It should be noted that the VPID is not the MAC address of a conventional printer or a server PC but is uniquely created by the relay virtual printer 303 in lexical order such that the created VPIDs can be controlled by the print relay server 102. The unit of grouping can be contemplated according to function (color, duplexing), use location (Office, Home), frequency of usage (frequent use, recently used), original VPID (VPID is re-assigned by a print relay server), or the like as printer attributes. Then, the control unit 502 transmits the grouped printer information to the print service 304.

Figure 18:
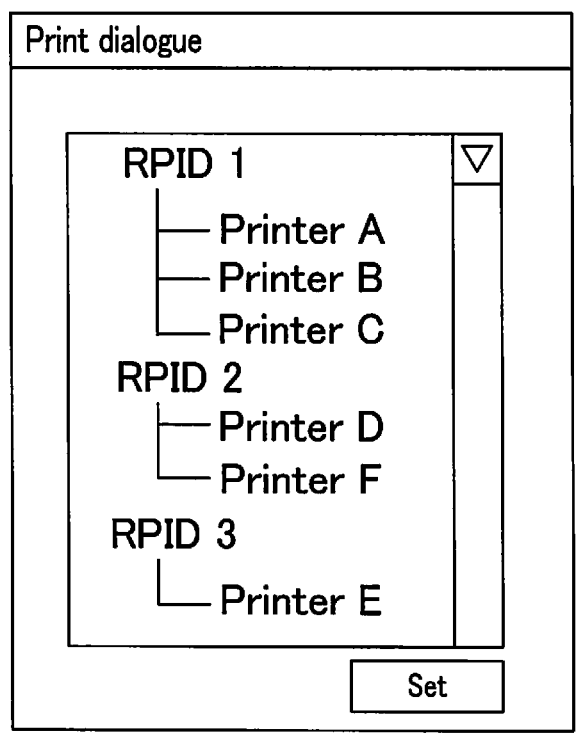
FIG. 18 shows an example of UI display using grouping by VPIDs.
Figure 19A:
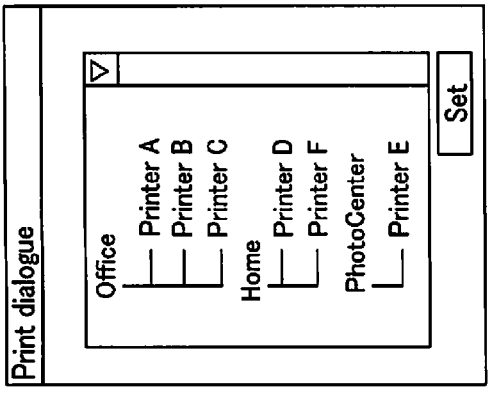
FIGS. 19A to 19F show specific examples of UI display using grouping by VPIDs.
Figure 19B:
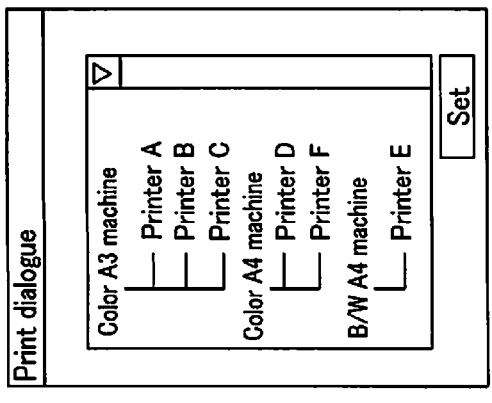
Figure 19C:
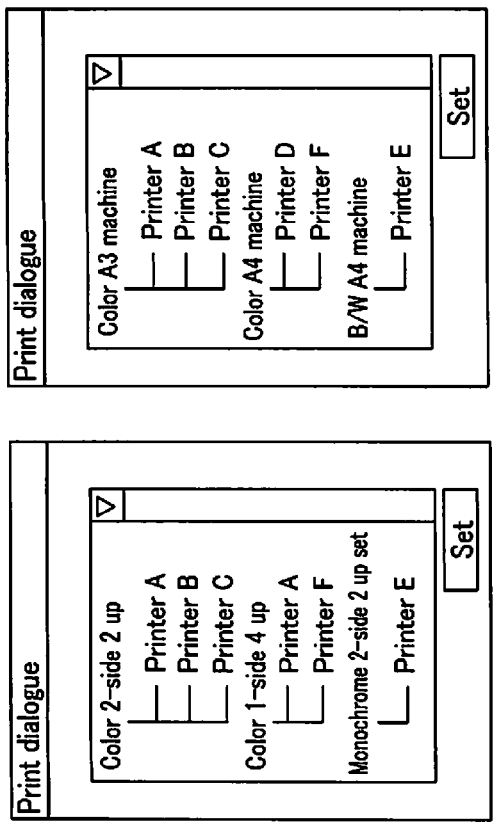
Figure 19D:
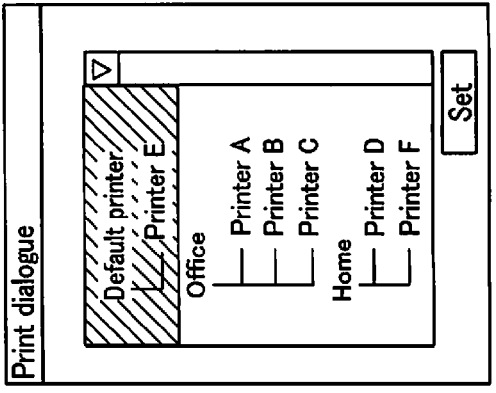
Figure 19E:
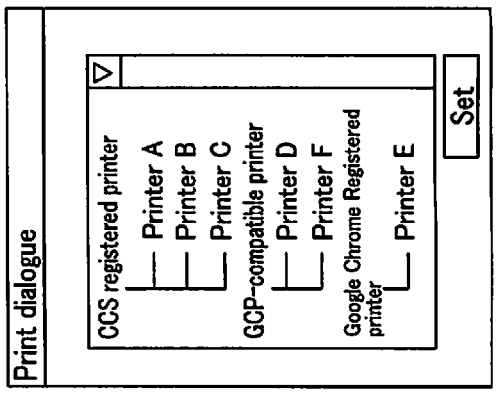
Figure 19F:
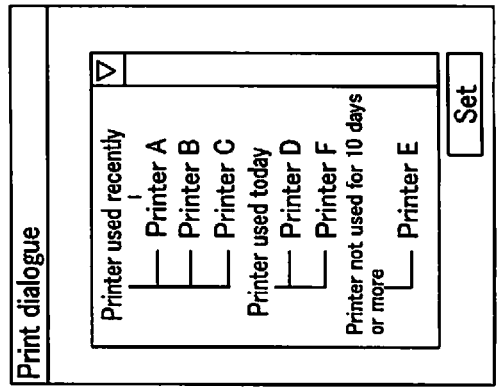

FIG. 18 shows an exemplary UI to be displayed by the Web browser 305 as a result of grouping using VPIDs by the control unit 502. As shown in FIG. 18, printers are displayed in a tree structure for each VPID. Since the VPID itself may not be comprehensible to a user, the control unit 502 may change the VPID separately into the "character string" for display. FIGS. 19A to 19F show exemplary UIs to be displayed by the Web browser 305 as a result of grouping using VPIDs by the control unit 502. FIG. 19A shows a UI classified by a function of printer, FIG. 19B shows a UI classified by a type of printer, FIG. 19C shows a UI classified by a use location of printer, FIG. 19D shows a UI classified by the frequency of usage of printer, FIG. 19E shows a UI classified by an original VPID of printer, and FIG. 19F shows a UI for separately classifying the default printer. As shown in FIG. 19A, the Printer A is present on both "color screen 2UP" and "color 1-side 4UP" classified into different groups. However, the control unit 502 can also perform management by making a single printer belong to a plurality of groups. As shown in FIG. 19F, the default printer is focused upon opening the UI by fixing the default printer to the head of the UI display so that the Printer E can function as the default printer.

Figure 20:
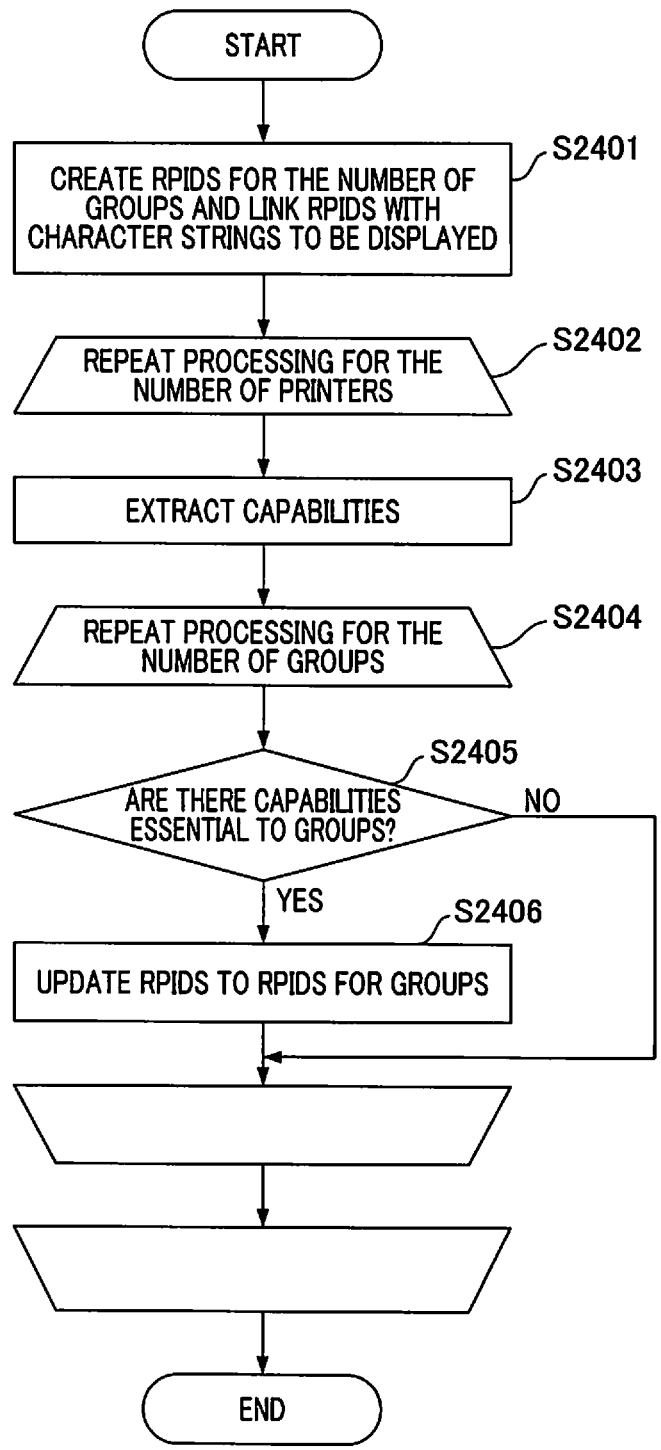
FIG. 20 shows processing for grouping VPIDs.

FIG. 20 shows a flowchart for assigning a VPID to each group. The processing is performed by the control unit 502 of the relay virtual printer management service 302. In step S2401, the control unit 502 creates the VPIDs for the number of groups, and links the VPIDs with character strings for display. The control unit 502 repeats the following processing for the number of printers (step S2402). In step S2403, the control unit 502 extracts capabilities, i.e., printer capabilities included in printer information from the print service information management unit 505. The control unit 502 repeats the processing for the number of groups (step S2404). In step S2405, the control unit 502 determines whether or not there are capabilities essential to groups. If the answer is YES, the VPIDs are updated to the VPIDs for groups in step S2406. Then, processing for assigning a VPID to each group is completed. The printer information registration unit 701 receives the grouped printer information from the control unit 502, and newly registers printers in the printer information storage unit 702 based on the received grouped printer information.

As described above, the print service 304 can provide a print setting screen on which a printer name linked to each printer attribute is displayed to a Web browser. In other words, the control unit 502 manages a plurality of VPIDs by dividing printers into groups so that the case for the print service 304 in which "registering a plurality of printers with a single VPID is undesirable in terms of performance" can be solved. Also, since the control unit 502 performs grouping using VPIDs, the Web browser 305 can display an UI that is readily usable by a user.

Third Embodiment

Among the "printers connected to a proxy PC having a dedicated interface implemented", there is also a printer that cannot be connected to a network and can only be connected to a local network via a USB or the like. In the first embodiment, a description has been given by taking an example in which all of the "printers having a dedicated interface implemented" or the "printers connected to a proxy PC having a dedicated interface implemented" are re-registered via a print relay server. In the third embodiment, a description will be given by taking an example in which a part of "printers connected to a proxy PC having a dedicated interface implemented" remains to be registered via a "proxy PC having a dedicated interface implemented" instead of taking a detour through a print relay server.

Upon receiving printer information from the print service 304, the control unit 502 of the relay virtual printer management service 302 determines whether or not a "printer connected to a proxy PC having a dedicated interface implemented" is provided "with the network function". If the "printer connected to a proxy PC having a dedicated interface implemented" is provided "with the network function", the control unit 502 may prompt the printer connected to the PC to perform resettings. If the control unit 502 determines that the "printer connected to a proxy PC having a dedicated interface implemented" is not provided "with the network function" but is a printer that only support a local connection such as a USB connection, the control unit 502 leaves the original registration via the "proxy PC having a dedicated interface implemented". In other words, if a printer cannot be connected to a network, the control unit 502 does not make additional settings for unregistered printer information to the print service 304. It should be note that the VPIDs set by the control unit 502 are changed in accordance with the VPID (MAC address) of the "proxy PC having a dedicated interface implemented" so as to be controlled by the relay virtual printer management service 302. More specifically, the VPIDs are adjusted to be sorted in lexical order. As described above, not only printers provided "with the network function" but also printers that only support a local connection such as a USB connection can be used and the order of UI display can be controlled by adjusting the VPIDs.

Fourth Embodiment

In the first embodiment, a description has been given by taking an example in which all of the "printers having a dedicated interface implemented" or the "printers connected to a proxy PC having a dedicated interface implemented" are re-registered via a print relay server. However, a part of "printers having a dedicated interface implemented" may also remain directly registered instead of taking a detour through a print relay server. For example, the session configuration between servers or printers may change due to collection or division of proxy, resulting in changes in locations on which a communication load is placed. Also, if all the printers are in connection, the load on the print relay server 102 may also increase.

For example, a "printer having a dedicated interface implemented", which is often used for consumer application as a "unit of distributing a communication load" or as a "unit of reducing a load on a print relay server", is connected to a conventional individual proxy. Also, printers other than a "printer having a dedicated interface implemented" which is often used for enterprise application may also be in connection via a print relay server. Upon printer registration, a step of determining the system architecture by the control unit 502 of the relay virtual printer management service 302 may be provided. Alternatively, a user may select the configuration using a UI display. More specifically, a user may select from the printer list upon printer registration that which printer is to be registered in the print relay server 102 so as to be able to execute the processing.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-279541 filed Dec. 21, 2011, which is hereby incorporated by reference herein in its entirety.

What is claimed is:

1. A print relay device that communicates with a print service server, which registers printer information including printer capabilities upon registration of an image forming device, receives print settings set by a user via a print setting screen displayed on a user device, and transmits a print job corresponding to the print settings to the image forming device, via a network, the print relay device comprising:
    an acquisition unit configured to acquire printer information which is registered in the print service server and is linked to the user;
    a specification unit configured to specify printer information that is not registered in the print relay device from among the acquired printer information; and
    a registration unit configured to additionally register printer information, in which information relating to the transmission destination in the printer information specified by the specification unit has been replaced with information indicating the transmission destination is the print relay device, in the print service server in order to receive the print job from the print service server to the image forming device via the print relay device.

2. The print relay device according to claim 1, wherein, when printer information not registered in the print relay device is specified, the registration unit changes a printer identification name included in printer information not registered in the print relay device to a printer identification name for the print relay device to thereby manage printer information not registered in the print relay device and printer information registered in the print relay device.

3. The print relay device according to claim 1, wherein, after a printer identification name included in printer information not registered in the print relay device is changed to a printer identification name for the print relay device, the registration unit causes the print service server to newly register printer information including the changed printer identification name and requests the print service server to delete printer information including the printer identification name prior to change from among printer information registered in the print service server.

4. The print relay device according to claim 1, wherein the acquisition unit acquires printer information, which is registered in the print service server and linked to the user, when an inquiry is made from the print service server or the image forming device, for each predetermined period, or each time the print relay device operates.

5. The print relay device according to claim 1, wherein, the registration unit groups the printer identification name for each printer attribute based on printer capabilities included in the printer information, and causes the print service server to newly register printer information including the grouped printer identification name so that the printer identification name linked to each printer attribute is displayed on the print setting screen of the user device when the print setting screen is transmitted.

6. The print relay device according to claim 5, wherein the printer attribute is one or a plurality of printer capabilities, a use location, frequency of use of a printer, a printer identification name, and the default printer or not.

7. The print relay device according to claim 1, wherein, when printer information not registered in the print relay device is specified from among the acquired printer information, the registration unit determines whether or not a printer corresponding to the printer information is a printer connectable to a network if the printer is not connected to the network, and does not add the specified printer information to printer information, which is registered in the print relay device, linked to the user device if the printer is unconnectable to a network whereas prompts resetting if the printer is connectable to a network.

8. A print system comprising:
  a print service server that registers printer information including printer capabilities upon registration of an image forming device, receives print settings set by a user via a print setting screen displayed on a user device, and transmits a print job corresponding to the print settings to the image forming device; and
  a print relay device that communicates with the print service server via a network,
  wherein the print relay device comprises:
    an acquisition unit configured to acquire printer information which is registered in the print service server and is linked to the user;
    a specification unit configured to specify printer information that is not registered in the print relay device from among the acquired printer information; and
    a registration unit configured to additionally register printer information, in which information relating to the transmission destination in the printer information specified by the specification unit has been replaced with information indicating the transmission destination is the print relay device, in the print service server in order to receive the print job from the print service server to the image forming device via the print relay device.

9. A method for controlling a print relay device that communicates with a print service server, which registers printer information including printer capabilities upon registration of an image forming device, receives print settings set by a user via a print setting screen displayed on a user device, and transmits a print job corresponding to the print settings to the image forming device, via a network, the method comprising:
  acquiring printer information which is registered in the print service server and is linked to the user;
  specifying printer information that is not registered in the print relay device from among the acquired printer information; and
  additionally registering printer information, in which information relating to the transmission destination in the printer information specified by the specification unit has been replaced with information indicating the transmission destination is the print relay device, in the print service server in order to receive the print job from the print service server to the image forming device via the print relay device.

10. A non-transitory storage medium on which is stored a computer program for making a computer execute a method for controlling a print relay device that communicates with a print service server, which registers printer information including printer capabilities upon registration of an image forming device, receives print settings set by a user via a print setting screen displayed on a user device, and transmits a print job corresponding to the print settings to the image forming device, via a network, the method comprising:
  acquiring printer information which is registered in the print service server and is linked to the user;
  specifying printer information that is not registered in the print relay device from among the acquired printer information; and
  additionally registering printer information, in which information relating to the transmission destination in the printer information specified by the specification unit has been replaced with information indicating the transmission destination is the print relay device, in the print service server in order to receive the print job from the print service server to the image forming device via the print relay device.

* * * * *